(12) United States Patent
Rhee et al.

(10) Patent No.: US 7,460,588 B2
(45) Date of Patent: Dec. 2, 2008

(54) DIGITAL SUBSCRIBER LINE (DSL) STATE AND LINE PROFILE CONTROL

(75) Inventors: Wonjong Rhee, Palo Alto, CA (US);
Iker Almandoz, Palo Alto, CA (US);
John M. Cioffi, Atherton, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 716 days.

(21) Appl. No.: 11/071,762

(22) Filed: Mar. 3, 2005

(65) Prior Publication Data

US 2006/0198430 A1     Sep. 7, 2006

(51) Int. Cl.
*H04B 1/38* (2006.01)
(52) U.S. Cl. ....................................... 375/222
(58) Field of Classification Search .................. 375/222
See application file for complete search history.

(56) References Cited

U.S. PATENT DOCUMENTS

| | | | |
|---|---|---|---|
| 6,058,162 | A | 5/2000 | Nelson et al. |
| 6,061,427 | A | 5/2000 | Ryoo |
| 6,111,936 | A | 8/2000 | Bremer |
| 6,236,714 | B1 | 5/2001 | Zheng et al. |
| 6,292,559 | B1 | 9/2001 | Gaikwad et al. |
| 6,356,585 | B1 | 3/2002 | Ko et al. |
| 6,532,277 | B2 | 3/2003 | Ulanskas et al. |
| 6,549,520 | B1 | 4/2003 | Gross et al. |
| 6,580,727 | B1 | 6/2003 | Yim et al. |
| 6,636,603 | B1 | 10/2003 | Milbrandt |
| 6,647,058 | B1 | 11/2003 | Bremer et al. |
| 6,744,811 | B1 | 6/2004 | Kantschuk |
| 6,785,371 | B1 | 8/2004 | Olafsson |

(Continued)

FOREIGN PATENT DOCUMENTS

CN     1210399     3/1999

(Continued)

OTHER PUBLICATIONS

Kerpez, "DSL Spectrum Management," IEEE Communications Magazine; vol. 40, No. 11; Nov. 2002; pp. 116-123; XP-001141239. (8 pgs).

(Continued)

*Primary Examiner*—Juan A Torres
(74) *Attorney, Agent, or Firm*—Blakely, Sokoloff, Taylor & Zafman

(57) ABSTRACT

Disclosed are systems and methods for evaluating whether to transition operation of a DSL line from a current line profile to one or more target line profiles. For example, in one embodiment, a method provides providing a profile transition matrix, a plurality of threshold tables, a plurality of sub-rules, and an overall rule. The method operates in the current profile and collects operational data on the DSL line. The method further performs one or more tests to evaluate the feasibility of the current line profile and each of the target line profiles, and then transitions the state to operate the DSL line in the highest feasible profile available. Evaluation of the feasibility of staying in the current state or moving to one of the target states may be based on distributions of reported and estimated data distilled from the operational data collected on the DSL line.

21 Claims, 9 Drawing Sheets

U.S. PATENT DOCUMENTS

| | | | |
|---|---|---|---|
| 7,035,249 | B2 | 4/2006 | Christensen et al. |
| 7,106,833 | B2 | 9/2006 | Kerpez |
| 2002/0009155 | A1 | 1/2002 | Tzannes |
| 2002/0118652 | A1 | 8/2002 | Ahmed et al. |
| 2002/0136397 | A1 | 9/2002 | Zeng et al. |
| 2003/0031241 | A1 | 2/2003 | Posthuma |
| 2003/0086514 | A1 | 5/2003 | Ginis et al. |
| 2003/0123560 | A1 | 7/2003 | Jacobsen et al. |
| 2004/0120390 | A1 | 6/2004 | Brown et al. |
| 2004/0161048 | A1 | 8/2004 | Zaleski et al. |
| 2005/0123028 | A1 | 6/2005 | Cioffi |
| 2005/0190826 | A1 | 9/2005 | Van Bruyssel et al. |
| 2005/0213714 | A1 | 9/2005 | Lanberg et al. |
| 2005/0220178 | A1 | 10/2005 | Ginis |
| 2005/0220179 | A1 | 10/2005 | Tsatsanis |
| 2005/0237940 | A1 | 10/2005 | Tennyson |
| 2006/0072722 | A1 | 4/2006 | Savoor et al. |
| 2006/0159026 | A1 | 7/2006 | Wu et al. |
| 2006/0159106 | A1 | 7/2006 | Slyke et al. |
| 2006/0164101 | A1 | 7/2006 | Fossion |
| 2007/0280334 | A1 | 12/2007 | Lv et al. |

FOREIGN PATENT DOCUMENTS

| | | |
|---|---|---|
| DE | 10001150 | 7/2001 |
| EP | 1009135 | 6/2000 |
| EP | 1213848 | 6/2002 |
| EP | 1699172 | 9/2006 |
| EP | 1804450 | 7/2007 |
| WO | WO-01/35611 | 5/2001 |
| WO | WO 01/35614 A1 | 5/2001 |
| WO | WO 03/013109 A1 | 2/2003 |
| WO | WO-2005/036919 | 4/2005 |
| WO | WO-2007/033579 | 3/2007 |

OTHER PUBLICATIONS

Song et al., "Dynamic Spectrum Management for Next-Generation DSL Systems," *IEEE Communications Magazine*; Oct. 2002; pp. 101-109; XP-002395021. (9 pgs).

International Search Report, International Application No. PCT/IB2006/000824 (4 pgs).

Written Opinion of the International Searching Authority, International Application No. PCT/IB2006/000824 (7 pgs).

Kerpez et al., "Advanced DSL Management," IEEE Communications Magazine; vol. 41, No. 9; Sep. 2003; pp. 116-123; XP-001177649. (8 pgs).

"International Search Report", *International Application No. PCT/IB2004003960*, 9 pgs.

"ITU-T Recommendation G.992.1", *Asymmetric digital subscriber line (ADSL) transceivers, Series G, as provided by International Searching Authority*, Reference No. XP-002321806, (Jun. 1999), 226-239.

"Written Opinion of the International Searching Authority", *International Application No. PCT/IB204003960*, 7 pgs.

Cendrillon, et al., "Optimal Multi-user Spectrum Management for Digital Subscriber Lines", *2004 IEEE International Conference on Communications*; vol. 1, Jun. 20-24, 2004., ISBN: 0-7803-8533, (Jun. 2004), 5 pgs.

Chan, Vincent M., et al., "Multiuser Spectrum Optimization for Discrete Multitone Systems with Asynchronous Crosstalk", *IEEE Transactions on Signal Processing*, vol. 55, No. 11, Nov. 2007. University of Toronto.

Cioffi, John, et al., "New Technology in Spectrum Management", *ANSI Contribution T1E1.4/2002-128*, (Apr. 8, 2002), 2 pgs.

Cioffi, John, et al., "10MDSL Beyond All Goals, and Spectrally Compatible with ADSL and VDSL, from CO or RTs", *ANSI Contribution T1E1.4/2002-129*, (Apr. 8, 2002), 10 pgs.

Cioffi, John, et al., "Autonomous Level 0 DSM Results: iterative-water-filing for ADSL", *ANSI Contribution T1E1.4/2002-057*, (Feb. 18, 2002), 10 pgs.

Cioffi, John M., et al., "Channel Identification with Dynamic Spectrum Management", *ANSI Contribution T1E1.4/2001-147*, (May 7, 2001), 8 pgs.

Cioffi, John, et al., "Channel Identification with Dynamic Spectrum Management", *ANSI Contribution T1E1.4/2001-147R1*, (Nov. 5, 2001), 9 pgs.

Cioffi, John, et al., "Coordinated Level 2 DSM Results: Vectoring of multiple DSLs", *ANSI T1E1.4/2002-059*, (Feb. 18, 2002), 8 pgs.

Cioffi, John, "Draft Sections 1 and 4 proposed, Dynamic Spectrum Management", *ANSI Contribution T1E1.4/2002-040R1*, (Apr. 8, 2002), 4 pgs.

Cioffi, John, et al., "Examples Improvements of Dynamic Spectrum Management", *ANSI Contribution T1E1.4/2001.*, (Feb. 19, 2001), 14 pgs. 089R1.

Cioffi, John, et al., "Indication of Capability to Release Channel Information", *ANSI Contribution T1E1.4/2001-146R2*, (Nov. 5, 2001), 3 pgs.

Cioffi, John, et al., "Indication of Capability to Release Channel Information", *ANSI Contribution T1E1.4/2002-041R1*, (Apr. 8, 2002), 3 pgs.

Cioffi, John, et al., "Indication of Capability to Release of Channel Information", *ANSI Contribution T1E1.4/2002-041R3*, (Aug. 19, 2002), 4 pgs.

Cioffi, John, et al., "Indication of Capability to Release of Channel Information", *ANSI Contribution T1E1.4/2002-041R4*, (Nov. 18, 2002), 3 pgs.

Cioffi, John, et al., "Iterative Waterfilling for Dynamic Spectrum Management", *ANSI Contribution T1E1.4/2001-200R3*, (Aug. 20, 2001), 1 pgs.

Cioffi, John, et al., "Iterative Waterfilling for Dynamic Spectrum Management", *ANSI Contribution T1E1.4/2001-200R5*, (Nov. 5, 2001), 14 pgs.

Cioffi, John, "Proposal for Study of Spectrum Management for the Evolving Unbundling Architecture of DSL", *ANSI Contribution T1E1.4/2001-090*, (Feb. 19, 2001), 3 pgs.

Cioffi, John, et al., "Proposed 'Stretch Goals' for 10MDSL", *ANSI Contribution TiE1.4/2002-181*, (Aug. 19, 2002), 6 pgs.

Cioffi, John, et al., "Proposed Scope and Mission for DSM (188)", *ANSI Contribution T1E1./2001-188R2*, (Aug. 20, 2001), 4 pgs.

Cioffi, John, et al., "Proposed Scope and Mission for DSM (188)", *ANSI Contribution T1E1.4/2001-188R4*, (Nov. 5, 2001), 4 pgs.

Cioffi, John, et al., "Response to 2001-273R1 using measured Verizon DSL SNRs", *ANSI Contribution T1E1.4/2002-069*, (Feb. 18, 2002), 15 pgs.

Cioffi, John, et al., "Some proposed Section 7.1 text for ADSL fixed-margin mode", *ANSI Contribution T1E1.4/2002-176*, (Aug. 19, 2002), 3 pgs.

Cioffi, John, et al., "Some proposed Section 7.1 text for ADSL fixed-margin mode", *ANSI Contribution T1E1.4/2002-176R1*, (Nov. 18, 2002), 13 pgs.

Cioffi, John, "Unbundled DSL Evolution", *ANSI Contribution T1E1.4/2001-088.*, (Feb. 19, 2001), 6 pgs.

Kerpez, K., "Jointly Optimizing DSL Spectra", *ANSI Contribution T1E1.4/2002-231*, (Nov. 18, 2002), 12 pgs.

Kerpez, K., et al., "Response to 2001-273R1 using Telecordia DSL Analysis", *ANSI Contribution T1E1.4/2002-063R1*, (Feb. 18, 2002), 3 pgs.

Le Nir, Vincent, et al., "Optimal Power Allocation under Per-Modem Total Power and Spectral Mask Constraints in xDSL Vector Channels with Alien Crosstalk", *ICASSP 2007*, (Apr. 15, 2007).

Lesham, A., "Dynamic FDM and Dynamic DS Power Back-Off: A Simplified DSM Algorithm for Coexistence between RT and CO based deployments", *ANSI Contribution T1E1.4/2002-284*, (Nov. 17, 2002), 9 pgs.

Liu, Yu-Sun, et al., "Distributed Dynamic Spectrum Management for Digital Subscriber Line", *Institute of Electronics, Information and Communication Engineers (IEICE)*, vol. E90-B, No. 3, Mar. 2007, 491-498.

Rhee, W., "Multiuser Wireless Communications with Multiple Antennas", *Dissertation Submitted to the Department of Electrical Engineering and the Committee on Graduate Studies of Standford University.*, (Jun. 2002), 129 pgs.

State IP Office of P.R. China, "Notification of the First Office Action", *Chinese Application No. 200480041317.4*, (Mar. 7, 2008).

Yu, W., "Competition and Cooperation in Multi-user Communication Environments", *Dissertation Submitted to the Department of Electrical Engineering and the Committee on Graduate Studies of Standford University*, (Jun. 2002), 120 pgs.

Yu, et al., "Competitive Equilibrium in the Gaussian Interface Channel", *IEEE International Symposium on Information Theory*, (ISIT), (Jun. 2000), 1 pg.

Yu, W., et al., "Distributed Multiuser Power Control for Digital Subscriber Lines", *IEEE Communications, Inc.*, New York, US, vol. 20 No. 5; Reference No. XP-001143168, (Jun. 2002), pp. 1105-1115.

Yu, Wei, et al., "Dual Methods for Nonconvex Spectrum Optimization for Multicarrier Systems", *IEEE Transactions on Communications*, vol. 54, No. 7, Jul. 2006, 1310-22.

Yu, et al., "Iterative Water-filling for Gaussian Vector Multiple Access Channels", *IEEE International Symposium on Information Theory*, (ISIT), (2001), 1 pgs.

Yu, et al., "On Constant-Power Waterfilling", *IEEE International Conference on Communications*, ICC, (Jun. 2001), 5 pgs.

Chung, Seong T., "Rate and power control in a two-user multicarrier channel with no coordination: the optimal scheme vs. suboptimal methods," Vehicular Technology conference, 2002, Proceedings, VTC 2002-Fall. 2002 IEEE 56th vol. 3, (Sep. 2002), 1744-1748.

Cioffi, John , et al., "Autonomous DSM Mixture of Symmetric and Asymmetric Service: Bi-directional Iterative Waterfilling (at Level 0 or at Level 1)," ANSI Contribution T1E1.4/2002-058R1, Feb. 18, 2002, 9 pgs.

Patent Cooperation Treaty, "International Search Report and Written Opinion," International Application No. US2006/026796, (Apr. 10, 2007), 7 pgs.

Patent Cooperation Treaty, "International Search Report and Written Opinion," PCT Application No. PCT/IB2006/000824, (Aug. 31, 2006), 11 pgs.

1. Requirements on good behavior

{RRDCm,ds = GOOD or ERDCm,ds = GOOD or EMDCm,ds = GOOD}
   & {RRDCm,us = GOOD or ERDCm,us = GOOD or EMDCm,us = GOOD}

2. Requirements on no bad behavior

{RRDCm,ds = GOOD/NOT_ENOUGH_DATA}
   & {ERDCm,ds = GOOD/NOT_ENOUGH_DATA}
   & {RMDCm,ds = GOOD/NOT_ENOUGH_DATA}
   & {RRDCm,us = GOOD/NOT_ENOUGH_DATA}
   & {ERDCm,us = GOOD/NOT_ENOUGH_DATA}
   & {RMDCm,us = GOOD/NOT_ENOUGH_DATA} if moving down,
   & {RCVDCn,ds = GOOD or
       RCVDCm,ds = GOOD/NOT_ENOUGH_DATA or
       ECVDCm,ds = GOOD}
   & {RNRDCn,ds = GOOD or RNRDCm,ds = GOOD/NOT_ENOUGH_DATA}

& {RCVDCn,us = GOOD or
       RCVDCm,us = GOOD/NOT_ENOUGH_DATA or
       ECVDCm,us = GOOD}
   & {RNRDCn,us = GOOD or RNRDCm,us = GOOD/NOT_ENOUGH_DATA} else (moving up or neither of moving up/down)
   & {RCVDCm,ds = GOOD or
       (RCVDCm,ds = NOT_ENOUGH_DATA and
           [FEC(n) < FEC(m) or RCVDCn,ds = GOOD]) or
       ECVDCm,ds = GOOD}
   & {RNRDCm,ds = GOOD or
       (RNRDCm,ds = NOT_ENOUGH_DATA and RNRDCn,ds = GOOD)}

& {RCVDCm,us = GOOD or
       (RCVDCm,us = NOT_ENOUGH_DATA and
           [FEC(n) < FEC(m) or RCVDCn,us = GOOD]) or
       ECVDCm,us = GOOD}
   & {RNRDCm,us = GOOD} or
       (RNRDCm,us = NOT_ENOUGH_DATA and RNRDCn,us = GOOD)}

DIGITAL SUBSCRIBER LINE (DSL) STATE AND LINE PROFILE CONTROL

CROSS-REFERENCE TO RELATED APPLICATIONS

This application is related to the following applications, the disclosures of which are incorporated herein by reference in their entireties for all purposes:

U.S. Ser. No. 10/795,593, filed Mar. 8, 2004, entitled ADAPTIVE FEC CODEWORD MANAGEMENT, which claims the benefit of priority under 35 U.S.C. § 119(e) of U.S. Provisional No. 60/527,853 filed on Dec. 7, 2003, entitled DYNAMIC MANAGEMENT OF COMMUNICATION SYSTEM.

U.S. Ser. No. 10/893,826, filed Jul. 19, 2004, entitled ADAPTIVE MARGIN AND BAND CONTROL, which claims the benefit of priority under 35 U.S.C. § 119(e) of U.S. Provisional No. 60/527,853 filed on Dec. 7, 2003, entitled DYNAMIC MANAGEMENT OF COMMUNICATION SYSTEM.

U.S. Ser. No. 10/981,068, filed Nov. 4, 2004, entitled COMMUNICATION DEVICE IDENTIFICATION.

U.S. Ser. No. 11/069,159, filed Mar. 1, 2005, now U.S. Patent Application Publication No. 2006-0098725 dated May 11, 2006, entitled DSL SYSTEM ESTIMATION INCLUDING KNOWN DSL LINE SCANNING AND BAD SPLICE DETECTION CAPABILITY.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communications systems. More specifically, this invention relates to managing operational states, such as line profiles, in a DSL system.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

In most of the deployed Asymmetric Digital Subscriber Line-1 (ADSL1) Digital Subscriber Line Access Multiplexers (DSLAMs) implementations, a "line profile" specifies parameters such as data rate, power spectral density (PSD), margin, forward error correction (FEC) parameters and a carrier mask (CMASK) for a particular DSL customer/line attached to the DSLAM. A "line profile" (also called a "profile") is different from a "service type," which refers to the data rate and latency ranges desired/allowed for a line depending on the payment or choice of the customer. Different customers may have different profiles. An example that lists controllable profile parameters appears in the table below:

Profile name: Profile1
Interleaving delay: Low (Fast channel)
Maximum PSD level for downstream: −46 dBm/Hz
Maximum downstream rate: 6016 kbps
Minimum downstream rate: 192 kbps
Maximum upstream rate: 416 kbps
Minimum upstream rate: 64 kbps
Maximum noise margin: 16 dB
Target noise margin: 6 dB
Minimum noise margin: 0 dB
Carrier mask to be used (in hexadecimal format):
    FFF01FFF0FFFFFFFFFFFFFE0001FFFFF00000000
    0000000000000000000000000

Operators currently use these profiles in a simple manner to control only an individual line's data rate, and perhaps FEC settings. Therefore, an individual line's profile is often selected manually, often causing the line to remain in that profile unless maintenance personnel manually change the profile during a trouble-ticket response or in response to a customer request for a different DSL service. Even when a line is allowed to move automatically to a few other profiles, strong restrictions have been applied, resulting in only a few profiles being considered as candidates for the move. Moreover, the rules for any profile change can be viewed as fixed or static functions of one or a very small number of line-characterizing parameters. Such simple transitions do not permit diverse service types and fail to assist in overcoming and/or addressing various noise impairments (for example, impulse noise and crosstalk noise), thereby limiting deployed datarate and/or range capabilities of ADSL and Very high speed Digital Subscriber Line (VDSL).

Systems, methods and techniques that permit implementation of a wide variety of line profiles and transitions between such profiles automatically and with ease in communication systems such as DSL systems would represent a significant advancement in the art. In particular, prioritization and implementation of transition options in the communication system would represent a considerable advancement in the field of DSL service rates and associated ranges.

BRIEF SUMMARY OF THE INVENTION

Transitions between states and/or profiles for a line in a communication system, such as a DSL system, can be controlled by evaluating the current state of the line and one or more target states. Evaluation of the feasibility of staying in the current state or moving to one of the target states can be based on distributions of reported and estimated data distilled from operational data collected from the communication system. The target states may be prioritized and arranged in a matrix or other framework making evaluation and selection more simple.

Feasibility may take into account both the sufficiency of the available data (reported and/or estimated) and the likelihood of the line's behavior in the current state and any target state under consideration. Probabilities of meeting operational and/or performance thresholds can be used in various sub-rules whose outputs can be combined in an overall rule that provides a feasibility decision. Weighting vectors can be used to weight or completely purge old data. In a DSL system these weightings, sub-rules and other factors may reflect differences between upstream and downstream behavior and data transmission. The various aspects of the present invention may be adjusted and/or updated adaptively or dynamically to accommodate changing line conditions, performance goals, etc.

Methods, techniques, apparatus, processes and equipment according to embodiments of the present invention may be implemented in a controller, DSL optimizer or the like. Such implementation may be part of a dynamic spectrum management system.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which:

FIG. 5 is an exemplary overall rule utilizing various sub-rules to yield a decisions as to whether a target state is feasible or, in some embodiments, not infeasible.

DETAILED DESCRIPTION OF THE INVENTION

Figure 1:
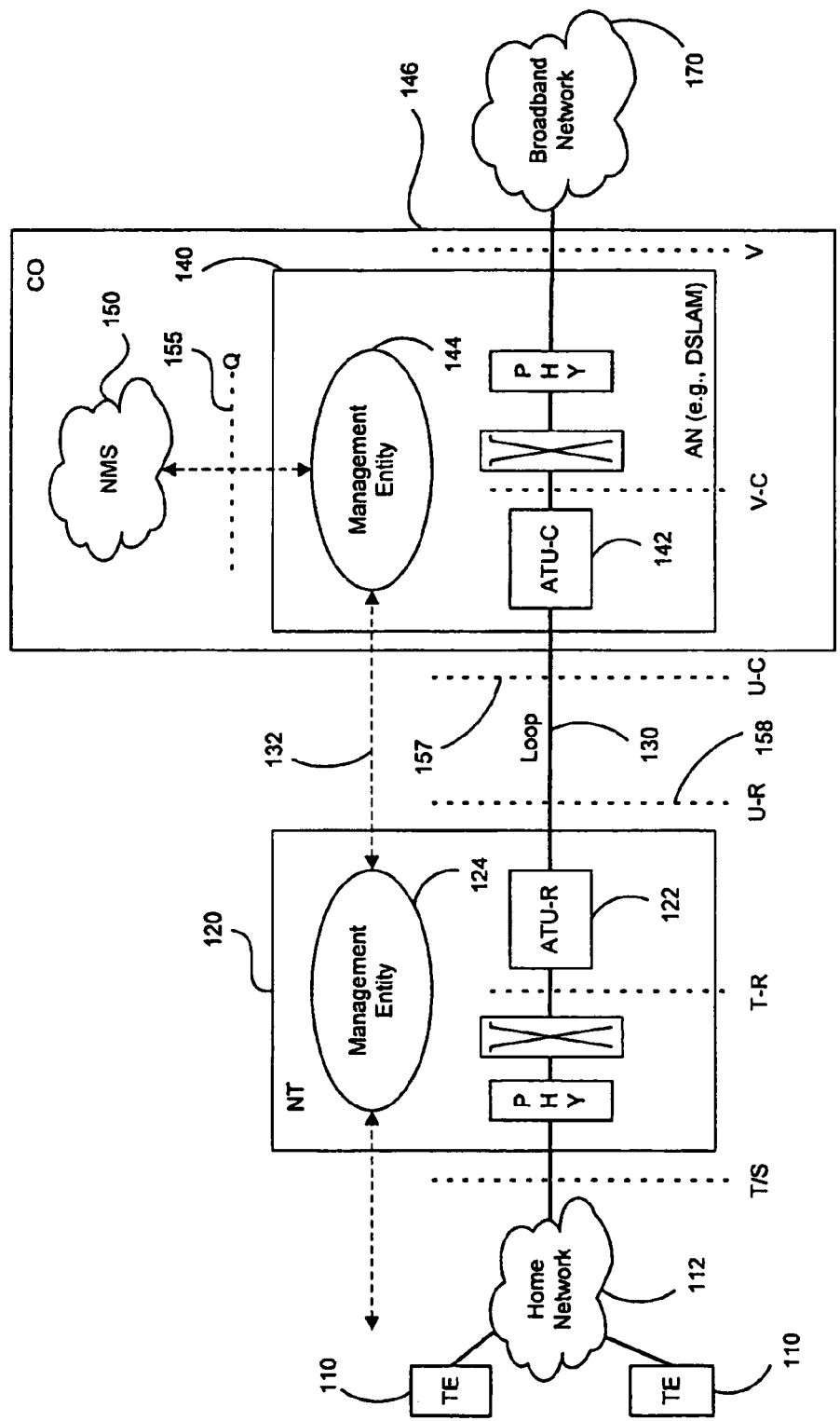
FIG. 1 is a schematic block reference model system per the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention implement state transitions that can flexibly realize different state transitions in one or more simple implementations. As used in the description herein (and unless stated to the contrary in a given instance), a "state" is equivalent to a profile. Grouping of a set of profiles into a single state is possible (for example, where a state is defined by rate only and several sub-states are consequently distinguished as a function of different settings for FEC, PSD, etc.). Such grouping can be implementation dependent.

In the explanation of the present invention, the term "profile" means "line profile." This is a definition of parameters used to operate the line such as data rate, FEC settings, etc. The term "state" refers to a position within a given state-transition diagram or other scheme. In some embodiments of the present invention, 2 or more lines may be operating using the same "profile," though they are in different "states." For example, assume that Line 1 has moved from Profile 1A (using a maximum data rate of 1.0 Mbps) to Profile 1B (using a maximum data rate of 1.5 Mbps). Further assume that Line 2 has moved from Profile 2A (using a maximum data rate of 3.0 Mbps) to Profile 2B (using a maximum data rate of 1.5 Mbps). Both Lines 1 and 2 may now be using the same "profile" possessing a maximum data rate of 1.5 Mbps, but be in different states since their prior profile operation histories and/or parameter selections are different. Only the maximum data rates are the same. Each state may have a maximum data rate, but not all lines with the same maximum data rate correspond to the same state. Similarly, not all lines with the same maximum data rate may correspond to the same profile either. For purposes of evaluating potential subsequent transitions, Profile 1B and Profile 2B may thus be identical profiles, but different states. Those skilled in the art will appreciate that existing DSL systems may equate all three terms so that state, maximum data rate and profile all roughly correspond to the same situation. However, depending on the embodiment of the present invention, this invention permits all 3 terms to be potentially different. Those skilled in the art will be able to distinguish the various cases specifically described herein and otherwise covered by the present invention by the context and nature of the systems used and so described.

In many of the specific examples presented herein of embodiments of the present invention, states and profiles may be the same. That is, prior profile history is not considered "directly" in determining the state of a line. Instead, in many embodiments, the feasibility of a state transition may include weighting (including disregarding and/or purging) reported and estimated data relating to prior profile operation for a line. Therefore, the feasibility of a future transition (that is, the suitability of a target profile or state) takes into account what might otherwise be accounted for by a more elaborate state definition system. Therefore, as will be appreciated by those skilled in the art, while a "profile" and a "state" are the same in many embodiments of the present invention, nothing herein limits these terms to mean the same thing and, in other embodiments, they may differ in substantive ways from one another. However, unless indicated otherwise, the embodiments illustrated and explained herein will use systems in which states and profiles mean the same thing.

If a system is not built based on the concept of profiles and instead allows independent control of rate, power, etc. for individual lines, then at least two solutions are possible presently—a controller (such as a DSL optimizer) can construct a set of profiles and use only one of them for each individual user, or alternatively a controller can calculate the best parameters to use for a given service type and configure the line parameters accordingly. The first solution is discussed herein in greater detail, though both solutions will be apparent to those skilled in the art after reviewing the present disclosure and both are embodiments of the present invention.

As described in more detail below, a state-transition control unit implementing one or more embodiments of the present invention can be part of a controller (for example, a DSL optimizer, dynamic spectrum manager or spectrum management center). The controller and/or state transition control unit can be located anywhere. In some embodiments, the controller and/or state transition control unit reside in the DSL CO, while in other cases they may be operated by a third party located outside the CO. The structure, programming and other specific features of a controller and/or state transition control unit usable in connection with embodiments of the present invention will be apparent to those skilled in the art after reviewing the present disclosure.

A controller, such as a DSL optimizer, Dynamic Spectrum Management (DSM) Center or "DSM Center" a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from the modems. In other cases, the controller may be collocated with one of or both of the modems as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will use ADSL systems as exemplary communications systems. Within these ADSL systems, certain conventions, rules, protocols, etc. may be used to describe operation of the exemplary ADSL system and the information and/or data available from customers (also referred to as "users") and/or equipment on the system. However, as will be appreciated by those skilled in the art, embodiments of the present invention may be applied to various communications systems, and the invention is not limited to any particular system. The present invention can be used in any data transmission system for which service quality may be related to control parameters.

Various network-management elements are used for management of ADSL physical-layer resources, where elements refer to parameters or functions within an ADSL modem pair, either collectively or at an individual end. A network-management framework consists of one or more managed nodes, each containing an agent. The managed node could be a router, bridge, switch, ADSL modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which is incorporated herein in its entirety by reference for all purposes, and in which embodiments of the present invention can be implemented. This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+ (G.992.5) and the G.993.x emerging VDSL standards, as well as the G.991.1 and G.991.2 SHDSL standards, all with and without bonding. This model is well known to those skilled in the art.

The G.997.1 standard specifies the physical layer management for ADSL transmission systems based on the clear embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data that are available at and can be collected from an access node (AN). The ADSL Forum's TR69 report also lists the MIB and how it might be accessed.

In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL standards) or any other suitable network termination modem, transceiver or other communication unit. Each modem can be identified, for example, by manufacturer and model number. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1, ATU-C 142 is located at an access node (AN) 140 in a CO 146. AN 140 may be a DSL system component, such as a DSLAM or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1 can be used for determining and collecting performance data. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998, which is incorporated herein by reference in its entirety for all purposes. Also, DSL Forum Working Text WT-87 (Rev. 6), entitled "CPE WAN Management Protocol" from the DSL Forum, dated January 2004 is incorporated herein by reference in its entirety for all purposes. Finally, DSL Forum Working Text WT-082v7, entitled "LAN-Side DSL CPE Configuration Specification" from the DSL Forum, dated Jan. 5, 2004 is incorporated herein by reference in its entirety for all purposes. These documents address different situations for CPE side management.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from an ADSL NMS can be found therein; others may be known to those skilled in the art.

In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
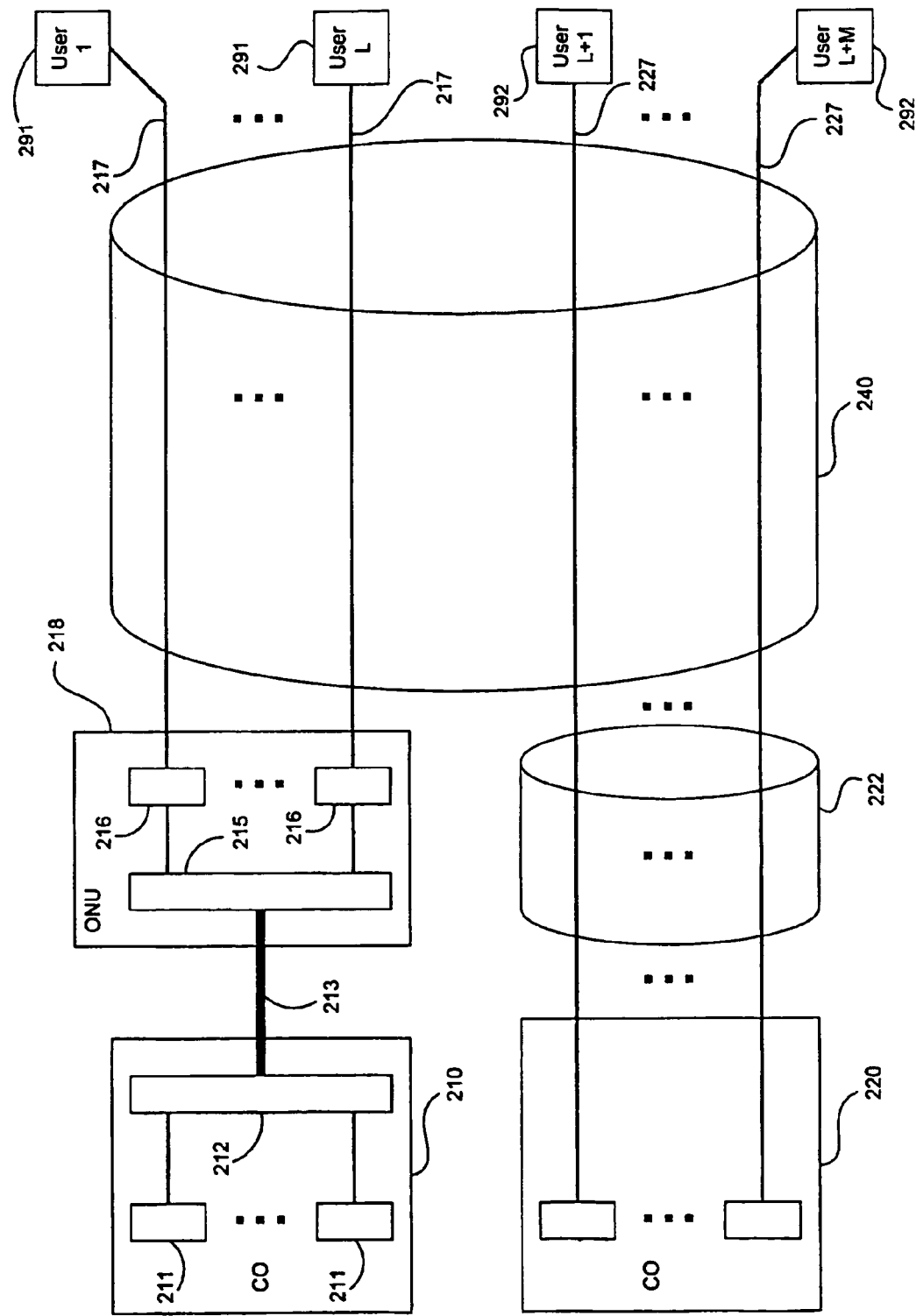
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292.

Figure 3A:
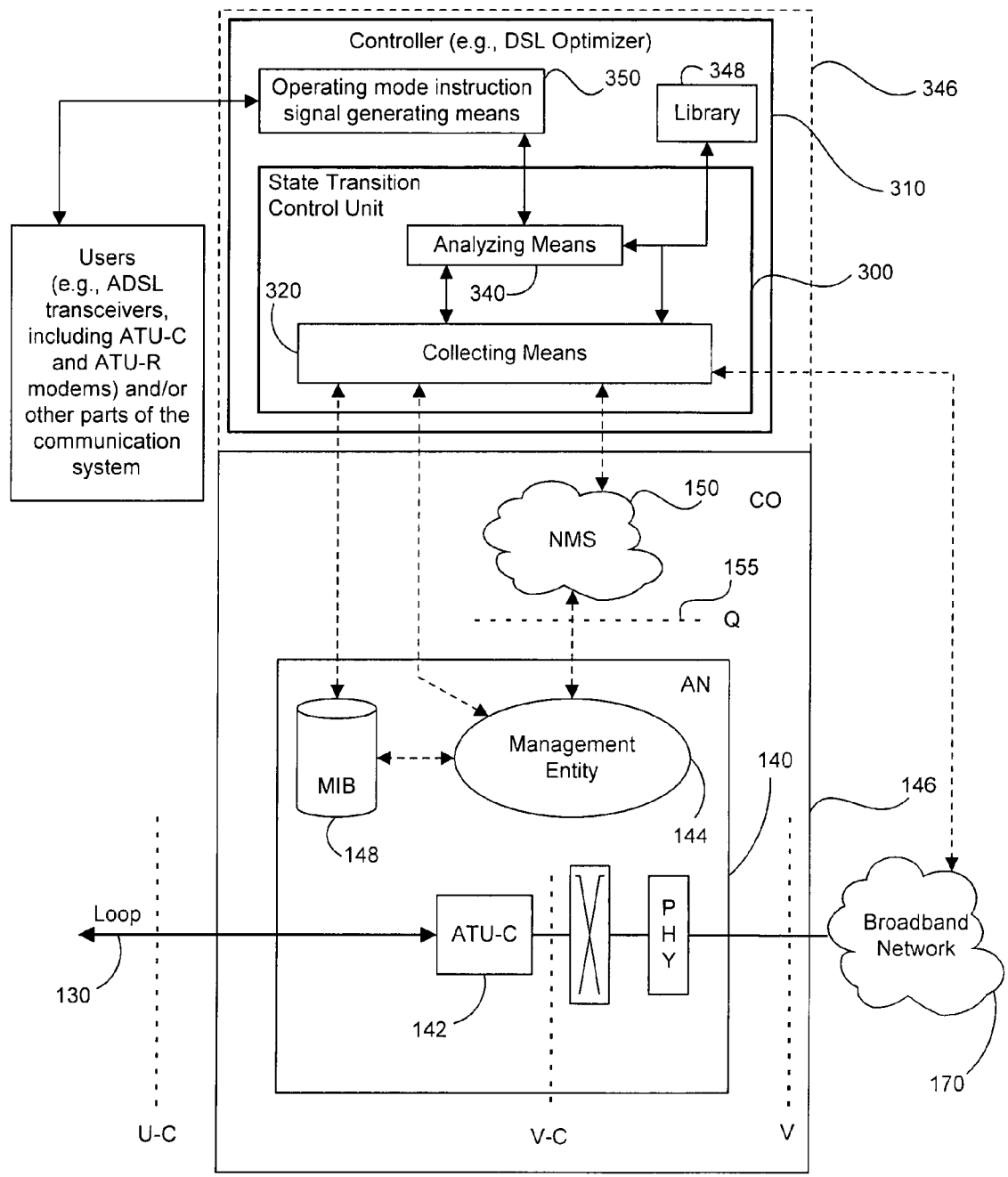
FIG. 3A is a schematic block diagram of one embodiment of the present invention in a DSL system.

According to one embodiment of the present invention shown in FIG. 3A, a state transition control unit 300 may be part of an independent entity coupled to a DSL system, such as a controller 310 (for example, a DSL optimizer, DSM server, DSM Center or a dynamic spectrum manager) assisting users and/or one or more system operators or providers in optimizing their use of the system. (A DSL optimizer may also be referred to as a dynamic spectrum manager, Dynamic Spectrum Management Center, DSM Center, System Maintenance Center or SMC.) In some embodiments, the controller 310 may be an ILEC or CLEC operating a number of DSL lines from a CO or other location. As seen from the dashed line 346 in FIG. 3A, the controller 310 may be in the CO 146 or may be external and independent of CO 146 and any company operating within the system. Moreover, controller 310 may be coupled to and/or controlling DSL and/or other communication lines in multiple COs.

The state transition control unit 300 includes collecting means 320 and analyzing means 340. As seen in FIG. 3A, the collecting means 320 may be coupled to NMS 150, ME 144 at AN 140 and/or the MIB 148 maintained by ME 144. Data also may be collected through the broadband network 170 (for example, via the TCP/IP protocol or other protocol or means outside the normal internal data communication within a given DSL system). One or more of these connections allows the state transition control unit to collect operational data from the system. Data may be collected once or over time. In some cases, the collecting means 320 will collect on a periodic basis, though it also can collect data on-demand or any other non-periodic basis (for example, when a DSLAM or other component sends data to the state transition control unit), thus allowing the state transition control unit 300 to update its information, rules, sub-rules, etc., if desired. Data collected by means 320 is provided to the analyzing means 340 for analysis and any decision regarding state transition.

In the exemplary system of FIG. 3A, the analyzing means 340 is coupled to a modem and/or system operating signal generating means 350 in the controller 310. This signal generator 350 is configured to generate and send instruction signals to modems and/or other components of the communication system (for example, ADSL transceivers and/or other equipment, components, etc. in the system). These instructions may include state transition instructions or other instructions regarding acceptable data rates, transmit power levels, coding and latency requirements, etc. The instructions may be generated after the controller 310 determines the priority and availability of alternate operating states/profiles in the communication system. In some cases, for example, the instruction signals can assist in improving performance for one or more customers and/or operators using the system.

Embodiments of the present invention can utilize a database, library or other collection of data pertaining to the data collected, decisions made regarding relevant parameters, past decisions using rules and sub-rules such as those discussed below, etc. This collection of reference data may be stored, for example, as a library 348 in the controller 310 of FIG. 3A and used by the analyzing means 340 and/or collecting means 320.

In some embodiments of the present invention, the state transition control unit 300 may be implemented in one or more computers such as PCs, workstations or the like. The collecting means 320 and analyzing means 340 may be software modules, hardware modules or a combination of both, as will be appreciated by those skilled in the art. When working with a large numbers of modems, databases may be introduced and used to manage the volume of data collected.

Figure 3B:
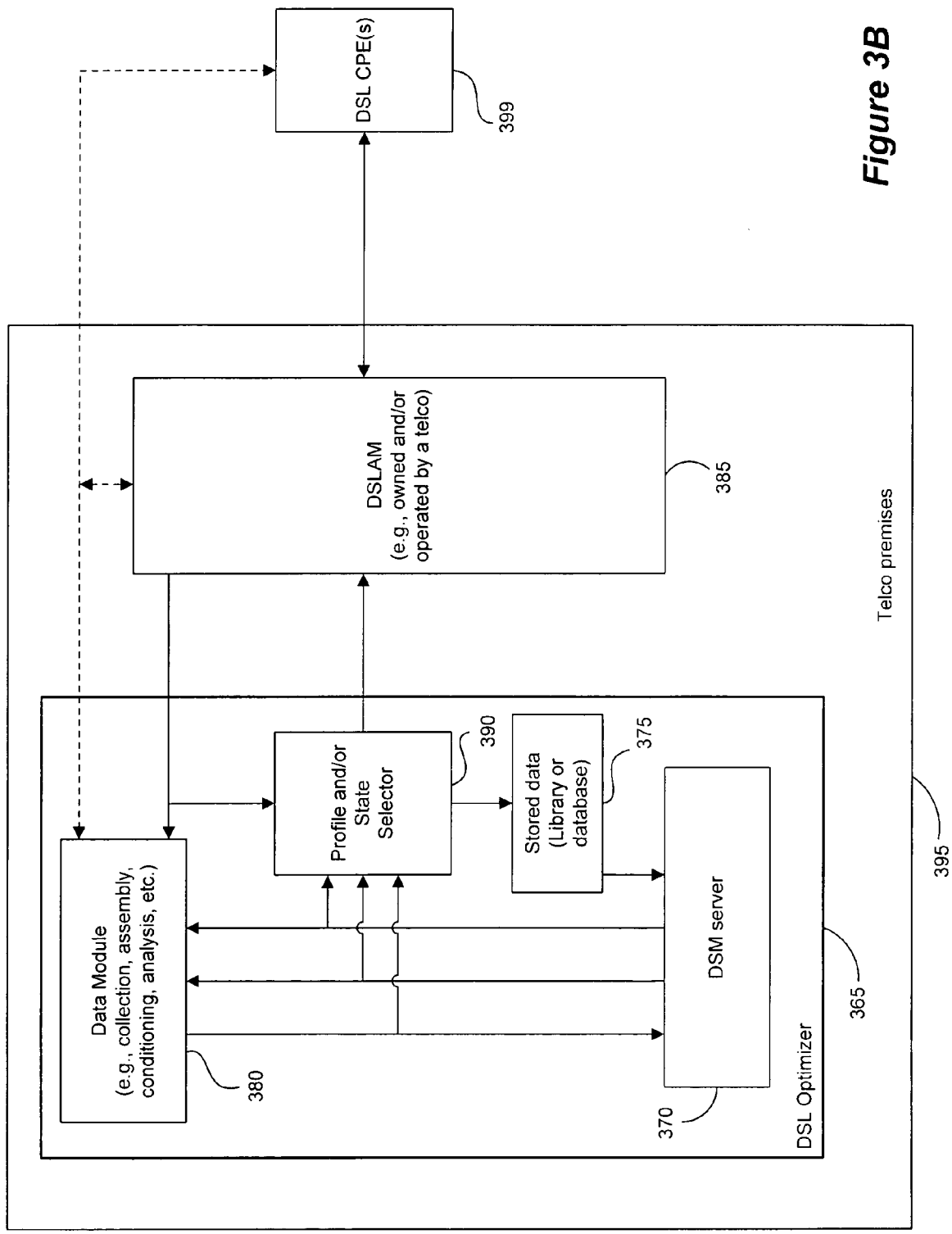
FIG. 3B is a schematic block diagram of another embodiment of the present invention in a DSL system.

Another embodiment of the present invention is shown in FIG. 3B. A DSL optimizer 365 operates on and/or in connection with a DSLAM 385 or other DSL system component, either or both of which may be on the premises 395 of a telecommunication company (a "telco"). The DSL optimizer 365 includes a data collection and analysis module 380, which can collect, assemble, condition, manipulate and supply operational data for and to the DSL optimizer 365. Module 380 can be implemented in one or more computers such as PCs or the like. Data (which may include reported data and estimated data, described in more detail below) from module 380 is supplied to a DSM server module 370 for analysis (for example, feasibility tests, data sufficiency evaluation, data purging and weighting, adjusting state priorities, adjusting matrices and vectors, updating threshold tables, etc.). Information also may be available from a library or database 375 that may be related or unrelated to the telco. A profile selector 390 may be used to select and implement profiles and/or states according to any state and/or profile transition decisions and/or instructions. Profiles may be selected under the control of the DSM server 370 or by any other suitable manner, as will be appreciated by those skilled in the art. Profiles selected by selector 390 are implemented in the DSLAM 385 and/or any other appropriate DSL system component equipment. Such equipment may be coupled to DSL equipment such as customer premises equipment 399. The system of FIG. 3B can operate in ways analogous to the system of FIG. 3A, as will be appreciated by those skilled in the art, though differences are achievable while still implementing embodiments of the present invention.

Figure 4:
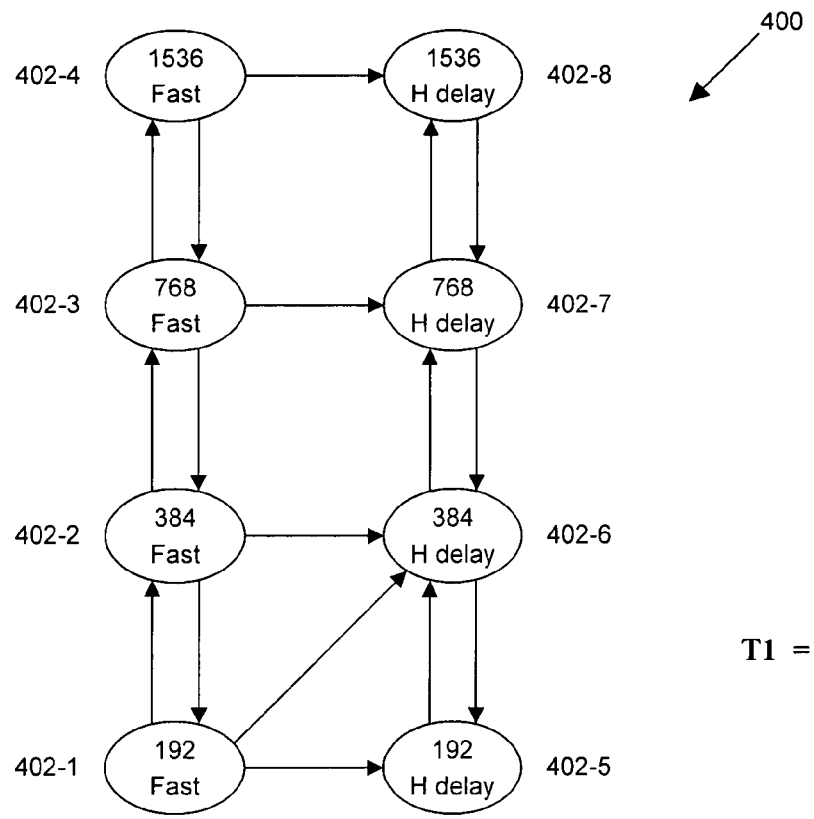
FIG. 4 includes an exemplary state transition diagram and matrices incorporating the state transition diagram and prioritization of the transitions available between various states.

Several embodiments of one aspect of the present invention are shown in FIG. 4. The state diagram 400 illustrates 8 profiles 402-1, 402-2, 402-3, 402-4, 402-5, 402-6, 402-7 and 402-8, in which a communication line, which for purposes of explanation and illustration will be deemed a DSL line, may operate. In this example each profile is defined by a maximum attainable data rate (192, 384, 768 or 1536 kbps) and a latency ("Fast" meaning no interleaving; "H delay" meaning interleaving producing a high delay).

In FIG. 4, if a line is operating using profile 1, then from both the state diagram and the state-transition matrix T1, it can be seen that profiles 1, 2, 5 and 6 are possible transitions (remaining in profile 1 is not a transition in sense of a change, but for ease of reference, remaining in the same profile may nevertheless be referred to as a "transition" herein). However, the state-transition matrix T1 does not indicate which transition, if any, should have priority above other transitions. Therefore, the change to matrix T2 of FIG. 4 can be made, where priority is specified by an integer value. The higher the positive integer value, the less attractive the designated profile is for service provider implementation.

In transition matrix T2, 0 still means that the transition is not allowed, and any positive integer means that the transition is allowed. The lowest positive integer has the highest priority above any other transition. For instance, a line in profile 1 will try to move to profile 2 if possible (that is, the priority is 1 from matrix T2). If profile 2 is not appropriate (for example, if the code violations are expected or measured to be too high in profile 2, "appropriateness" can be defined in some embodiments as feasibility as discussed in more detail below), then the line will attempt a move to profile 6 (that is, having a priority of 2 from matrix T2). If profile 6 is not appropriate, then profile 1 (having a priority of 3) will be examined and the profile would not be changed, if profile 1 is appropriate. If profile 1 also is not appropriate, then the line will move to profile 5, which has the lowest priority (that is, a priority of 4).

Transition matrix T2 of FIG. 4 can thus indicate both the possibility and the priority of transitions for each state/profile. The structure of T2 enables simple variation of many different profile characteristics such as data rate, power level, flat power-spectral-density (PSD) reference level, maximum margin, minimum margin, target margin, FEC delay, FEC strength and PSD shaping (sometimes known as PSD-MASK). For instance, depending on a set of specific permitted service types, some profiles can be blocked, while other profiles are given lower priorities. Alternatively, profiles with smaller carrier masks can be given higher priorities for the customers who pay accordingly (where economic factors are taken into consideration by the operator). Various lines can be thus programmed to yield part of the band whenever possible to enable better service on other lines (not taking into account regulatory implications of such polite binder sharing, which may be possible in some cases and not in others). As another example, profiles with higher target margins (TNMR) can be given higher priorities for a line that has frequent changes in noise level(s). The weighted state-transition matrix T2 thus allows dynamic change of the rules for profile selection as well as the dynamic selection of profile itself.

An operator attempting revenue and/or service maximization or improvement via the various features of state transitions may desire to enlarge the number of profiles in T2. Profiles may be implemented to include a combination of data rate, PSD level, target/minimum/maximum margins, carrier masks, FEC settings and so on. Consequently, the total number of profiles can be larger than several hundred. In such a case T2 likely will become a sparse matrix with most of its elements equal to 0, and a more manageable state transition matrix is matrix T of FIG. 4.

The column entries of matrix T represent available "next" states in order of priority going down each column. For example, the first column indicates that profile 1's first priority is to move to profile 2, the next priority is to move to profile 6, and then to stay in profile 1. If none of these profiles are feasible, then the line will move to profile 5, which is at the bottom of the first column. The fifth column indicates that profile 5's first priority is to move to profile 6, and then to stay in profile 5. In the format of matrix T, the matrix can be much smaller than N×N, where N is the total number of profiles/states, allowing more compact storage and/or transmission of state-transition information. A service provider's translator could provide the matrix T to a DSM controller (for example, a DSL optimizer) for each and every line (as identified by telephone number). Such specification of T allows the service provider to affect or control service revenue. Such storage or transmission is then more efficient with the more compact form of T (relative to T2). A further simplification (not shown in the present example) is possible by writing the priorities in a plain text format and removing 0s.

When a line is in an unknown state or profile, or if a line's state/profile is not part of T, then a guidance rule can be applied. For example, one rule will move the line to the safest profile within T. Another guidance rule might move the line to the profile in T that is closest to the current profile (in terms of data rate, FEC, margin, etc.).

Each individual line can have a different state-transition matrix. For example, a customer paying more or requiring mission-critical service could be given a transition matrix that tries to achieve as high a data rate as is possible at any cost, while another customer might be given a transition matrix that tries to yield power and spectrum as much as possible while the maximum data rate is limited to a target (specified) value in the allowed profiles/states for that line. A line with unstable noise spectrum characteristics can be given a transition matrix where a high TNMR is often used for the various allowed profiles, while a line with stable noise spectrum characteristics can be given a transition matrix where a low TNMR is more often used. This essentially is adaptive margin control, which is possible only if profiles with various margins are available (or if a profile is decomposed into rate profile, PSD profile, TNMR profile, etc.). Adaptive margin control and techniques for implementing the same are explained in more detail in U.S. Ser. No. 10/893,826, filed Jul. 19, 2004, entitled ADAPTIVE MARGIN AND BAND CONTROL and owned by Adaptive Spectrum And Signal Alignment, Inc. of Redwood City, Calif., the entire disclosure of which is incorporated herein by reference. Besides the transition matrix, the feasibility threshold table, discussed below, also can be modified from line to line to adjust the aggressiveness of trying advantageous profiles.

The transition matrix of a line also could be updated as needed and/or desired during operation. For example, the priorities of profiles with lower PSDs and smaller bandwidths can be increased if the line was detected to be a major FEXT source for several neighboring lines or simply an intrusive noise source into a premium customer's line. Later, the original priorities can be restored if the assessment was shown to be incorrect or the assessment needs to change with changing customer topologies, demand, and practices. Such a reprioritization might require agreement between the controller (for example, a DSL Optimizer) and service provider.

Knowing the prioritization of states is not sufficient in all embodiments of the present invention. In some embodiments, to assist in determining prioritization of states/profiles, the feasibility of available states is evaluated and, in some cases, quantified. For example, for any line of interest in one embodiment, the information in the transition matrix T and current state is always available. Because priorities are already specified in T, a controller such as a DSL optimizer simply needs to examine the feasibility of candidate transitions and choose the feasible next state with highest priority (the state/profile with the lowest priority may be deemed to be feasible at any time without examination). As will be appreciated by those skilled in the art, feasibility may be determined in different ways. The "best state" and "best line profile" or "best available line profile" mean the state and/or line profile that is both feasible and possesses the highest priority. In cases where a "presumption of innocence" is used, as in some of the embodiments of the present invention, the best state and/or line profile is the state and/or line profiles that has not been deemed infeasible and possesses the highest priority.

For example, in the foregoing examples, an ADSL line (which may be used by a customer or other user) is using or is "in" state n (that is, profile n) and that line is being considered for a transition to state m (that is, a "target state" or profile m). In this example, for the two profiles n and m, at least one of the following 7 fields would be different: data rate, PSD, TNMR (target noise margin—this is TSNRM in ITU standards), MAXNMR (maximum noise margin—this is MAXSNRM in ITU standards), MINNMR (minimum noise margin this is MINSNRM in ITU standards), carrier mask (CARMASK in ITU standards), or FEC (INP and DELAY in ITU standards). The fundamental of the feasibility test for state m in this embodiment is to ensure stable performance, which for this line may suggest or mandate any or all of the following: low code violation (CV) counts, low retraining counts, low latency. (The last item, low latency, may need to be guaranteed only for latency-sensitive users using applications such as network games or VoIP. However, as will be appreciated by those skilled in the art, unless the use of latency-sensitive applications is detected, it may not be important to a user and thus latency is not addressed in any more detail in discussing the present invention.)

To perform a feasibility test for state m, two types of "operational data" can be used by a controller such as a DSL optimizer. First, reported data (which is the directly observed operation and/or performance while the line was in state m that is reported to a controller) will be available only if the line's history includes any short or long stay in state m or any relevant states (that is, states from which reported data for state m can be computed using simple equations). The second type of operational data, estimated data, is the estimated operation and/or performance of the communication line in state m. This estimation may be based on one or more noise spectrum estimations that can always be done, so that estimated data will be available even if the line has never stayed in state m or any relevant states before. Reported data and estimated data can be obtained, calculated, determined, etc. by collecting operational data from the communication system, for example by using a data collection module and/or collecting means in a controller such as a DSL optimizer, as illustrated in FIG. 3A or FIG. 3B.

The feasibility test used may consider two types of performance impairments—non-impulsive noise (such as AWGN, NEXT and FEXT) and impulse noise. Other impairments may be present and may be addressed, as will be appreciated by those skilled in the art. The DSLAM-reported parameters that are relevant to non-impulsive noise are NMR (noise margin—this is SNRM in ITU standards) and MAXR (maximum attainable data rate—this is ATTNDR in ITU standards). The parameters that are relevant to impulse noise are CV (code violation count) and FCC (FEC correction counts). Techniques and apparatus for increasing INP (decreasing N) statistically based on code-violation observations and distributions and related FEC operational techniques and characteristics are disclosed in U.S. Ser. No. 10/795,593, filed Mar. 8, 2004, entitled ADAPTIVE FEC CODEWORD MANAGEMENT and owned by Adaptive Spectrum And Signal Alignment, Inc. of Redwood City, Calif., the entire disclosure of which is incorporated herein by reference. NR (the number of trainings) is relevant to both types of noise. If the line is in state m during time interval t, the following five parameters may be collected periodically from a DSLAM (or from an ATU-R if communication paths between the ATU-R and a controller such as a DSL Optimizer are available):

| | |
|---|---|
| $RCV_{m,t}$ | Reported code violation counts during time interval t. |
| $RFCC_{m,t}$ | Reported FEC correction counts during time interval t. |
| $RM_{m,t}$ | Reported noise margin at the end of time interval t. |
| $RR_{m,t}$ | Reported max attainable data rate at the end of time interval t. |
| $RNR_{m,t}$ | Reported number of retraining counts during time interval t. |

(Regarding the last parameter, retrain counts: retrains can be initiated for various reasons, such as change of profile, loss of power at the modem, and high noise power or large number of code violations. From among these various reasons, only the retrains caused by high noise/large number of code violations need to be considered in the present example.

For the present discussion, $$NR_{m,t}=LOS_{m,t}-LPR_{m,t}-NPC_{m,t}$$

where $LOS_{m,t}$ is the reported number of signal losses;
$LPR_{m,t}$ is the reported number of power losses; and
$NPC_{m,t}$ is the number of profile changes.)

Notation for such parameters can be generalized to $PARAM_{m,t}$ where PARAM is the parameter under consideration, such as RCV, RFCC, RNR, RM, or RR. The first letter "R" is used to denote "reported" data as opposed to an "E" for "estimated" data, as defined and distinguished herein. Further discussion omits the t constraint and considers the consequent quantity to be a random variable. Thus, when t is omitted from these expressions, there is a corresponding distribution of the random variable that will be considered instead of the particular sample or "time" value of the parameter. Thus, for example, NRm is a random variable that can take many values. A controller such as a DSL optimizer can compute and update distributions for this random variable.

| | |
|---|---|
| $RCV_m$ | Random variable that models the reported number of code violation counts of the line of interest. The distribution is calculated by DSM Center based on the observation of data points, $RCV_{m,t}$. |
| $RFCC_m$ | Random variable that models the reported FEC correction counts of the line of interest. |
| $RNR_m$ | Random variable that models the reported number of retraining counts of the line of interest. |
| $RM_m$ | Random variable that models the reported noise margin of the line of interest. |
| $RR_m$ | Random variable that models the reported max attainable data rate of the line of interest. |

The reported data points of the first three parameters, $RCV_{m,t}$, $RFCC_{m,t}$, and $RNR_{m,t}$ are usually collected every 15 minutes in many DSL systems and each such collected value corresponds to the number of CVs, FCCs or NRs collected over the immediately preceding 15 minute interval. Each such collected count can be used to update the distribution for the corresponding random variable. All reported data points of the five parameters above can be reported from a DSLAM to a controller and consequently all can have distributions updated when collected. $RM_{m,t}$ and $RR_{m,t}$ may not have been measured over 15 minute intervals, however.

The cardinality of any of these reported data values is denoted $C[PARAM_m]$ and represents the number of data points ($PARAM_{m,t}$) used in the calculation of the distribution of any particular parameter (the distribution $PARAM_m$). The cardinality is correctly defined as the size of a data set that is used to calculate the distribution of the random variable, but the notation is somewhat abused since the notation of the data set is not defined but $PARAM_m$ is used inside of C[ ]. The notation is used thusly in this disclosure for simplicity. A straightforward probability distribution calculation would divide the number of occurrences of a particular parameter value by its cardinality for any particular state. More sophisticated distribution estimation will likely reduce the influence of distant past values in favor of more recently observed (or reported) values and several such methods are disclosed below and will be well understood by those skilled in the art.

When profile m is being considered as the candidate for the next state, one or more distributions calculated and possibly updated during any recent or otherwise relevant time periods can be used to determine if profile m is feasible. For instance, if large (high) probabilities for each of low values of $RCV_m$, and high values of $RM_m$ and of $RR_m$ have been computed by the controller (that is, these values are likely for all the recent stays in state m), the controller can confidently move the line to state m. (Again, note that "state" and "profile" are used interchangeably with regard to these embodiments, though they may not be equivalent in other embodiments of the present invention.)

In some cases, however, the state m might have been only briefly used or never used before, and thus the amount of observed (or reported) data might not be adequate to make a reliable decision on a target profile m. In such a case estimated data can be used to aid decision making. However, the following methods based on simple equations also can be used for each data type to increase the size and/or amount of reported data available.

$RCV_{m,t}$—As an example, consider an ADSL 1 system that has three types of FEC levels: F (Fast-buffer, no interleaving), M (Medium-delay interleaving) and H (High-delay interleaving). A wider array of FEC choices may be available, and it should be straightforward for those skilled in the art to extend the 3-level example to any other situations. When $RCV_{i,t}$ is available where state i has the same rate, PSD, TNMR and carrier mask as state m, but different FEC, the following can be used to find $RCV_{m,t}$:

$$RCV_{f,t} \geq RCV_{md,t} \geq RCV_{h,t}$$

$$RCV_{f,t} \approx RCV_{md,t} + RFCC_{md,t} \approx RCV_{h,t} + RFCC_{h,T}$$

States f, md and h have the same data rate, PSD, TNMR and carrier mask, but different FEC levels (f: fast buffer, md: medium delay, h: high delay). The first equation holds because CV decreases as FEC protection increases. The second equation holds because CV+FCC is the total number of effective impulses. As will be appreciated by those skilled in the art, the second equation may need to be modified in some situations. For example, $RCV_{h,t} + RFCC_{h,t} \leq RCV_{f,t} \leq RCV_{md,t} + RFCC_{md,t}$ for DSLAMs where coding gain is largest for H-delay, and smallest for M-delay.

$RM_{m,t}$—When $RM_{i,t}$ is available where state i has the same current operation data rate (not the maximum or minimum rate in the profile, but the current operation data rate when the margin was reported) as the planned rate of state m and the same carrier mask as state m, but different PSD, TNMR or FEC level, the following equations can be used to find $RM_{m,t}$:

$$RM_{m,t}=RM_{i,t}+[PSD_{m,t}-PSD_{i,t}]+[CG_{m,t}-CG_{i,t}],$$

where PSD is the transmit power spectrum density, and CG is coding gain (all in decibels).

$RR_{m,t}$—When $RR_{i,t}$ is available where state i has the same PSD, TNMR, carrier mask and FEC as state m, but different rate, the following equation can be used to find $RR_{m,t}$ because reported max rate is independent of current rate:

$$RR_{m,t} = RR_{i,t}$$

The constraint on FEC can be removed if any simple rule is used to reflect the change of coding gain. (A simple method might be to do water-filling to find the rate increase/decrease caused by the coding-gain change. Such a method, however, requires some level of signal processing (water-filling), which is not the intention of using reported data for feasibility testing. Such processed data may alternately be obtained via an estimated maximum rate anyway.)

As for $NR_m$, there is no known easy way of approximation, and thus the random variable $NR_m$ and its consequent distribution will be available only if the line history includes any short/long stay in state m.

Using various techniques, an estimated insertion loss (that is, Hlog) can always be available to a controller such as a DSL optimizer, and consequently the noise spectrum always can be estimated for any profile in use. Such techniques can be found in U.S. Ser. No. 11/069,159, filed Mar. 1, 2005, now U.S. Patent Application Publication No. 2006-0098725 dated May 11, 2006, entitled DSL SYSTEM ESTIMATION INCLUDING KNOWN DSL LINE SCANNING AND BAD SPLICE DETECTION CAPABILITY and owned by Adaptive Spectrum And Signal Alignment, Inc., the entire disclosure of which is incorporated herein by reference. In fact, a controller can use the concept of "noise types" for individual lines, where a newly observed noise spectrum is registered as a new noise type, and any noise spectrum similar to one of the previously registered noise types triggers a count increase for that noise type. The noise types and their counts (that is, probability(ies)) are always updated independent of the profile/state in which the line is operating. For each noise type, the noise margin and maximum attainable data rate can be calculated using water-filling, and thus the number of total occurrences of any and all noise types is the cardinality of the distribution for the estimated NMR (noise margin) and estimated MAXR (maximum attainable data rate). Therefore, the distributions of random variables representing margin and the maximum attainable rate of state m can be estimated based on Hlog, noise types, and the profile information of state m by performing water-filling for each estimated noise type to compute new values for each of these types. The use of such water-filling techniques is well known and covered, for example, in DSL Advances, (Starr, Sorbara, Cioffi, and Silverman, Prentice Hall, 2003). The cardinalities of the estimated noise margin and the estimated maximum attainable rate associated with state m are usually much larger than the cardinalities of reported values of these same two quantities associated with state m.

| | |
|---|---|
| EMm | The random variable corresponding to an estimated distribution of noise margin for profile m, based on noise types and their probabilities. |
| ERm | The random variable corresponding to an estimated distribution of max attainable rate for profile m, based on noise types and their probabilities. |

The estimation of NMR and MAXR based on water-filling is straightforward for those skilled in the art and will not reviewed in detail. The estimation of CV, FCC and NR is more subtle. Because there is no way for a controller such as a DSL optimizer to estimate the power and frequency of impulse-noise when CV=FCC=0, the only way to acquire such impulse-noise information is to try a state with either a high data rate or a small margin. NR is also difficult to estimate until the desired state is tried. Thus, the cardinality of the ECV, EFCC, and ENR can be expected to be small or often zero.

Reported and estimated data tend to complement one another, so that feasibility testing of state transitions benefits from using both types of data. For example, while reported data is complete in terms of furnishing all data fields, estimated data is incomplete (for example, there is no information on CV/FCC/NR). Besides, data estimation can suffer from certain factors, such as errors from quantization and clipping of reported margin and transmit power (for instance, communication devices might report margins in integer values between 0 and 31 only, and transmit power in integer values between 0 and 20 only), or errors from channel and noise estimates. Also, while estimated data is guaranteed to be available (since it is generated by a controller, DSL optimizer or the like), reported data may not be available (for example, it may only be available if state m or another relevant state was used before). In addition, the amount of reported data available may be relatively small (because it is collected only when a line is in state m or another relevant state), while a large amount of estimated data typically is available because operational data can be collected and exclusionary data calculated continually. Finally, reported data typically is more sensitive to one time errors (for example, incorrect margin and maximum rate calculations inside a system modem, asynchronous data collection time of margin, maximum rate, etc.) and the reported data could be quite misleading if the number of data samples collected from state m or another relevant state is small (that is, the impact of one erroneous datum can be large). On the other hand, estimated data is generally less sensitive because the number of samples is usually large, thereby reducing the effect(s) of one, or relatively few erroneous data.

One or more feasibility tests can decide if a line in state n (profile n) can move to a different state m. That decision is based on the distributions of the observed and estimated data (more sophisticated rules can be used by analyzing data beyond its distribution, and such rules are briefly discussed below). For implementation of the feasibility test in some embodiments of the present invention, the final decision can be based on the results from 32 independent conditions; 16 for downstream transmissions and 16 for upstream transmissions. Downstream transmission conditions follow:

| | |
|---|---|
| $RRDC_{n,ds}$ | Reported maximum attainable data Rate Distribution Condition for current state n. |
| $RRDC_{m,ds}$ | Reported maximum attainable data Rate Distribution Condition for target state m. |
| $ERDC_{n,ds}$ | Estimated maximum attainable data Rate Distribution Condition for current state n. |
| $ERDC_{m,ds}$ | Estimated maximum attainable data Rate Distribution Condition for target state m. |
| $RMDC_{n,ds}$ | Reported Margin Distribution Condition for current state n. |
| $RMDC_{m,ds}$ | Reported Margin Distribution Condition for target state m. |
| $EMDC_{n,ds}$ | Estimated Margin Distribution Condition for current state n. |
| $EMDC_{m,ds}$ | Estimated Margin Distribution Condition for target state m. |
| $RCVDC_{n,ds}$ | Reported Code Violation count Distribution Condition for current state n. |
| $RCVDC_{m,ds}$ | Reported Code Violation count Distribution Condition for target state m. |
| $ECVDC_{n,ds}$ | Estimated Code Violation count Distribution Condition for current state n. |
| $ECVDC_{m,ds}$ | Estimated Code Violation count Distribution Condition for target state m. |

-continued

| | |
|---|---|
| $RNRDC_{n,ds}$ | Reported Number of Retrain count Distribution Condition for current state n. |
| $RNRDC_{m,ds}$ | Reported Number of Retrain count Distribution Condition for target state m. |
| $ENRDC_{n,ds}$ | Estimated Number of Retrain count Distribution Condition for current state n. |
| $ENRDC_{m,ds}$ | Estimated Number of Retrain count Distribution Condition for target state m. |

The same set of conditions can be considered for upstream transmission, thus resulting in a total of 32 conditions. To illustrate one embodiment of the present invention, downstream conditions are explained in detail below (the designator "ds" is therefore omitted). As will be appreciated by those skilled in the art, similar rules apply to upstream conditions. As mentioned above, CV and NR are not easy to estimate, and thus ECVDC and ENRDC might not be used at all in some embodiments. However, all 32 conditions can be at least considered so that any future learning can be integrated easily into this general feasibility test structure.

Feasibility of state transitions may require simultaneous satisfaction of more than one of the conditions. In some cases, therefore, the final decision on feasibility of target state m may be dependent on results from the outputs of all or some of the sub-rules, any applicable contingency rules and an overall decision rule, one example of which is explained below. A sub-rule is here defined as one of multiple conditions that must be satisfied for a rule governing state-transition.

Each sub-rule is based upon either reported or estimated data for either state n or m. Sometimes there will be too little or no data to examine, and the controller can apply a contingency rule to such situations—illustrating some of the differences between learning dynamics of the present invention and previous static, non-learning state machines. In the presently illustrated embodiment of the present invention, it is constitutionally presumed that a state/profile is "innocent" (that is, feasible) until proven "guilty" (that is, infeasible). Rather than being conservative and never trying a preferred state, any new state can be tried until it is proven to be infeasible. In the worst case of such a presumption of innocence, the communication line will show unstable performance until the next profile change. However, the design of the matrix T can minimize the risk. For example, the impact of instability will be very small if T allows only small amounts of rate increase per state transition. In general, there is a tradeoff between minimizing risk of highly unstable states and quickly converging to a best state while using a smaller number of profiles. This tradeoff is controlled through the matrix T and various programmed thresholds for feasibility tests used by a controller such as a DSL optimizer.

Most lines' maximum data rates, margins etc. are time-varying, and thus the distribution of the associated random variable may be spread over many values. Therefore the sub-rules are based upon the distribution. A simple example is given to illustrate the use of the reported max attainable data rate distribution.

EXAMPLE

Where it is of interest to change only the data rate of a line from 1.5 Mbps (profile n, max rate of profile=1.5 Mbps) to 3 Mbps (profile m, max rate of profile=3 Mbps), a simple rule based on reported max rates might be:
Move to state m if all values of $RR_{m,t}$ are above 3.5 Mbps for all reported data points, $RR_{m,t}$.

This "better than 3.5 Mbps all the time" rule might work well for some lines, but may be too conservative for other lines that occasionally experience $RR_{m,t}=3$ Mbps for a very short period of time. Instead of using this simple non-probabilistic condition, a controller such as a DSL optimizer can adopt one or more probabilistic criteria, where the distribution of $RR_m$ replaces the single static condition with multiple conditions:
Move to state m if $Pr\{RR_m \geq 3.5 \text{ Mbps}\} \geq 50\%$

AND $Pr\{RR_m \geq 3.0 \text{ Mbps}\} \geq 99\%$

AND $Pr\{RR_m \geq 2.5 \text{ Mbps}\} = 100\%$.

The conditions set forth in the preceding probabilistic statement are summarized in the following table:

| 3 Mbps Reported Max Rate Condition | | |
|---|---|---|
| State m Cutoff rate (=$f_1(m)$) Probability (=$p_1(m)$) 2.5 Mbps 100% | Cutoff rate (=$f_2(m)$) Probability (=$p_2(m)$) 3.0 Mbps 99% | Cutoff rate (=$f_3(m)$) Probability (=$p_3(m)$) 3.5 Mbps 50% |

The max rate=3.5 Mbps roughly corresponds to margin=8 dB if the line were instead operating at 3 Mbps. The max rate=3 Mbps corresponds to 6 dB (or TSNRM in general, but 6 dB for this example). The max rate=2.5 Mbps roughly corresponds to margin=4 dB, which is less than the typical target margin of 6 dB. The above rule has the following features:
(1) Retraining of the modem at a random time will result in 3 Mbps for 99% of time;
(2) Even when the noise level is increased, the margin will be guaranteed to be the same as or larger than 4 dB, and thus a retraining is unlikely; and
(3) The margin will be same as or above 8 dB for at least 50% of time.

The various feasibility-parameter values are associated with an index i and are denoted $f_i(m)$. (To be precise, $f_{i,PARAM}(m)$ should be used to indicate which parameter is being considered. In the above example, there are 3 conditions to be considered for testing the maximum data rate, and thus i=1, 2, 3. The probability that retraining of the modem will successfully satisfy the $i^{th}$ feasibility-condition is denoted $p_i(m)$. Again, $p_{i,PARAM}(m)$ is a more accurate notation. These feasibility parameters and their associated probabilities are explicitly shown as a function of the state or profile m. These parameters may be internal to the controller (DSL optimizer) and may be set as a function of any or all of line, time, modem type, and other distinguishing parameters.)

Again, two data types are available regarding maximum data rate—the reported maximum data rate ($RR_{m,t}$) and the estimated maximum data rate ($ER_{m,t}$). The reported maximum rate is calculated inside of the communication device (for example, a DSL modem), and thus accurate information on tone-by-tone SNR presumably is used. However, different vendor modems use different loading algorithms and different coding gains, and thus the $RR_{m,t}$ is often biased or misleading. On the other hand, the estimated maximum rate is based on channel and noise estimation, and thus tone-by-tone SNR might contain estimation errors. However, a common water-filling algorithm and common coding gains are used, and thus the $ER_{m,t}$ is neither biased nor misleading. Thus the two data types complement each other and therefore both are used as part of the sub-rules.

For each data type, conditions are examined for the current state n and the target state m. While conditions in the current state might not need to be considered in many situations, conditions in the target state play an important role almost all the time (because feasibility is being examined to see if the line can move to the target state m). Nonetheless, sub-rules for the current state as well as the target state can be used for completeness and, too, for possible future use.

The $RRDC_n$ (Reported Rate Distribution Condition for current state n) rule is considered first, and several parameters are defined as follows:

| | |
|---|---|
| $C_{RRn}$ | The cardinality of $RR_n$ (that is $C[RR_n]$). $C_{RRn}$ is the number of available data points for calculating the distribution of $RR_n$. |
| $M_{RRn}$ | The required minimum number of data points to guarantee reliability of the derived distribution of $RR_n$. If $C[RR_n] \geq M_{RRn}$, then the derived distribution is assumed to be fully reliable. If not, the distribution might not be reliable. |
| $Pr[\rho]$ | The probability of $\rho$, which is computed based upon the controller's calculated distribution for the particular parameter. |
| $N_{RRn}$ | The number of conditions to be examined for $RRDC_n$ rule. |
| $f_{i,RRn}(n)$ | The i'th cutoff parameter related to the i'th condition examined for state n. |
| $p_{i,RRn}(n)$ | The i'th required minimum probability related to the i'th condition (sub-rule) examined for state n. |
| $G_{i,RRn}(n)$ | The number of Good data points that satisfy $RR_{n,t} \geq f_{i,RRn}(n)$. Among $C_{RRn}$ available data points, some will be larger than the i'th cutoff parameter, $f_{i,RRn}(n)$, and some will not be. $G_{i,RRn}(n)$ is the number of data points meeting the cutoff value. |
| $B_{i,RRn}(n)$ | The number of Bad data points that do not satisfy $RR_{n,t} \geq f_{i,RRn}(n)$. Note that $G_{i,RRn}(n) + B_{i,RRn}(n) = C_{RRn}$ for any i. |

The $RRDC_n$ rule examines whether the derived distribution of the current state s reported maximum data rate, $RR_n$, violates any of the $N_{RRn}$ conditions. As for the output, NOT_GOOD indicates one or more violations, GOOD indicates no violation, and NOT_ENOUGH_DATA indicates that a reliable decision cannot be made.

Following is a simple version of a Reported Rate Distribution Condition (RRCn) rule:

| | |
|---|---|
| if | $C_{RRn} \geq$ AND<br>~{ $Pr[RR_n \geq f_{i,RRn}(n)] \geq P_{i,RRn}(n)$ for all i = 1, 2, ..., $N_{RRn}$}<br>Return NOT_GOOD |
| elseif | $C_{RRn} \geq M_{RRn}$ AND<br>$Pr[RR_n \geq f_{i,RRn}(n)] \geq P_{i,RRn}(n)$ for all i = 1, 2, ..., $N_{RRn}$<br>Return GOOD |
| else | Return NOT_ENOUGH_DATA |

The first if-clause says that if enough data points are available and the resulting distribution violates any of the $N_{RRn}$ conditions, then "NOT_GOOD" should be returned. The following "elseif"-clause says that if enough data points are available and the resulting distribution does not violate any of the conditions, then "GOOD" should be returned. If the number of data points is too small ($C_{RRn}<M_{RRn}$), then NOT_ENOUGH_DATA is reported.

Sometimes, even when $C_{RRn}<M_{RRn}$, it might be possible to reliably claim a violation or no violation because the following inequality always holds when $C_{RRn}<M_{RRn}$:

$$\frac{G_{i,RRn}(n)}{M_{RRn}} \leq Pr[RR_n \geq f_{i,RRn}(n)] \leq \frac{M_{RRn} - B_{i,RRn}(n)}{M_{RRn}}$$

The left side is equivalent to $Pr[RR_n \geq f_{i,RRn}(n)]$ if the future $M_{RRn}-C_{RRn}$ data points are all below the cutoff parameter $f_{i,RRn}(n)$ (a worst-case assumption). The right side is equivalent to $Pr[RR_n \geq f_{i,RRn}(n)]$ if the future $M_{RRn}-C_{RRn}$ data points are all above the cutoff parameter $f_{i,RRn}(n)$ (a best-case assumption). Therefore, if $$\frac{M_{RRn} - B_{i,RRn}(n)}{M_{RRn}} \geq p_{i,RRn}(n)$$

is not satisfied for any i, then a violation can be reliably determined, and $$\frac{G_{i,RRn}(n)}{M_{RRn}} \geq p_{i,RRn}(n)$$

will guarantee no violation after the next $M_{RRn}-C_{RRn}$ data point collections. This additional technique can be very helpful in some cases, and leads to the following RRDCn rule for the current state n (a max function is used to deal with the two situations; $C_{RRn} \geq M_{RRn}$ and $C_{RRn}<M_{RRn}$):

Sample Sub-Rule 1 if ~

$$\left\{ \frac{\max(C_{RRn}, M_{RRn}) - B_{i,RRn}(n)}{\max(C_{RRn}, M_{RRn})} \geq p_{i,RRn}(n) \text{ for all } i = 1, 2, \ldots, N_{RRn} \right\}$$

Return NOT_GOOD elseif $\frac{G_{i,RRn}(n)}{\max(C_{RRn}, M_{RRn})} \geq p_{i,RRn}(n)$ for all $i = 1, 2, \ldots, N_{RRn}$ Return GOOD else Return NOT_ENOUGH_DATA Each of the $N_{RRn}$ conditions for feasibility requires specification of two variables, $f_i(n)$ and $p_i(n)$, for each state n. These variables can be summarized into a table that is stored in the controller, for example in the library 348 of the controller 310 of FIG. 3A, or in the DSL optimizer 365 of FIG. 3B. A table, such as the one following, can be called an "RRDC$_n$ Threshold Table" and different tables can be adaptively used depending on service type or line condition.

| ... | ... | ... | ... | ... |
|---|---|---|---|---|
| State n + 1 | $f_{1,RRn}(n+1)$<br>$p_{1,RRn}(n+1)$ | $f_{2,RRn}(n+1)$<br>$p_{2,RRn}(n+1)$ | ... | $f_{N_{RRn},RRn}(n+1)$<br>$p_{N_{RRn},RRn}(n+1)$ |
| State n | $f_{1,RRn}(n)$<br>$p_{1,RRn}(n)$ | $f_{2,RRn}(n)$<br>$p_{2,RRn}(n)$ | ... | $f_{N_{RRn},RRn}(n)$<br>$p_{N_{RRn},RRn}(n)$ |
| State n − 1 | $f_{1,RRn}(n-1)$<br>$p_{1,RRn}(n-1)$ | $f_{2,RRn}(n-1)$<br>$p_{2,RRn}(n-1)$ | ... | $f_{N_{RRn},RRn}(n-1)$<br>$p_{N_{RRn},RRn}(n-1)$ |
| ... | ... | ... | ... | ... |

A controller such as a DSL optimizer may also make the table entries adaptive dynamic functions of time, line history, and equipment.

In a more general scenario, the "overall rule" discussed below might require outputs for K sets of distinct threshold tables. For instance, the threshold table that is used for increasing rate could be different from the threshold table that is used for decreasing rate. In such a case, two $RRDC_n$ rules ($RRDC_{n,1}$ and $RRDC_{n,2}$) associated with the two threshold tables can be defined, and each can be treated as an independent sub-rule. The output(s) of each sub-rule can be used to construct "overall rule."

The second sub-rule, $RRDC_m$ is almost same as $RRDC_n$ except for that the sub-rule is applied to the target state m, not current state n. The parameters and the sub-rule can be summarized as follows:

| | |
|---|---|
| $C_{RRm}$ | The cardinality of $RR_m$ (that is, $C[RRm]$). $C_{RRm}$ is the number of available data points for calculating the distribution of $RR_m$. |
| $M_{RRm}$ | The required minimum number of data points to guarantee reliability of the derived distribution of $RR_m$. If $C[RRm] \geq M_{RRm}$, then the derived distribution is assumed to be fully reliable. If not, the distribution might not be reliable. |
| $N_{RRm}$ | The number of conditions to be examined for RRDCm rule. |
| $f_{i,RRm}(m)$ | The i'th cutoff parameter related to i'th condition to be examined for state m. |
| $p_{i,RRm}(m)$ | The i'th required minimum probability related to i'th condition to be examined for state m. |
| $G_{i,RRm}(m)$ | The number of Good data points that satisfy $RR_{m,t} \geq f_{i,RRm}(m)$. Among $C_{RRm}$ available data points, some will be larger than the i'th cutoff parameter, $f_{i,RRm}(m)$, and some will not be. $G_{i,RRm}(m)$ is the number of data points that meets the cutoff value. |
| $B_{i,RRm}(m)$ | The number of Bad data points that do not satisfy $RR_{m,t} \geq f_{i,RRm}(m)$. Note that $G_{i,RRm}(m) + B_{i,RRm}(m) = C_{RRm}$ for any i. |

Sample Sub-Rule 2 if $\sim \left\{ \frac{\max(C_{RRm}, M_{RRm}) - B_{i,RRm}(m)}{\max(C_{RRm}, M_{RRm})} \geq p_{i,RRm}(m) \text{ for all } i = 1, 2, \ldots, N_{RRm} \right\}$ Return NOT_GOOD elseif $\frac{G_{i,RRm}(m)}{\max(C_{RRm}, M_{RRm})} \geq p_{i,RRm}(m)$ for all $i = 1, 2, \ldots, N_{RRm}$ Return GOOD else Return NOT_ENOUGH_DATA As in $RRDC_n$, a $RRDC_m$ Threshold Table can be described as below:

| | | | |
|---|---|---|---|
| ... | ... | ... | ... |
| State m + 1 | $f_{1,RRm}(m+1)$, $p_{1,RRm}(m+1)$ | $f_{2,RRm}(m+1), p_{2,RRm}(m+1)$ | ... |
| State m | $f_{1,RRm}(m), p_{1,RRm}(m)$ | $f_{2,RRm}(m), p_{2,RRm}(m)$ | ... |
| State m − 1 | $f_{1,RRm}(m-1)$, $p_{1,RRm}(m-1)$ | $f_{2,RRm}(m-1), p_{2,RRm}(m-1)$ | ... |
| ... | ... | ... | ... |

$ERDC_n$ can be summarized in a format similar to Sub-Rule 1, above. The only difference is that the estimated maximum attainable rates are used instead of the reported maximum attainable rates. By properly defining the 7 parameters for $ERDC_n$, the formats of Sub-Rule 1 and the RRDCn Threshold Table can be re-used for $ERDC_n$. $ERDC_m$ can be summarized in a format similar to Sub-Rule 2, above. The only difference arises from using the estimated maximum attainable rates instead of the reported maximum attainable rates.

Rules concerning margins are quite similar to the rules on maximum data rates. Only $RMDC_n$ is presented here. The other three rules will be apparent to those skilled in the art:

Sample Sub-Rule 3 if $\sim$ $\left\{ \frac{\max(C_{RMn}, M_{RMn}) - B_{i,RMn}(n)}{\max(C_{RMn}, M_{RMn})} \geq p_{i,RMn}(n) \text{ for all } i = 1, 2, \ldots, N_{RMn} \right\}$ Return NOT_GOOD elseif $\frac{G_{i,RMn}(n)}{\max(C_{RMn}, M_{RMn})} \geq p_{i,RMn}(n)$ for all $i = 1, 2, \ldots, N_{RMn}$ Return GOOD else Return NOT_ENOUGH_DATA

| | | | |
|---|---|---|---|
| ... | ... | ... | ... |
| State n + 1 | $f_{1,RMn}(n+1)$, $p_{1,RMn}(n+1)$ | $f_{2,RMn}(n+1), p_{2,RMn}(n+1)$ | ... |
| State n | $f_{1,RMn}(n), p_{1,RMn}(n)$ | $f_{2,RMn}(n), p_{2,RMn}(n)$ | ... |
| State n − 1 | $f_{1,RMn}(n-1)$, $p_{1,RMn}(n-1)$ | $f_{2,RMn}(n-1), p_{2,RMn}(n-1)$ | ... |
| ... | ... | ... | ... |

The rules on CV (Code Violations) can be analogized from the maximum data rate rules as were the margin rules above. The only difference is the direction of the inequalities. For a transition to be valid from a data rate point of view, the reported/estimated rate values cannot be less than the cutoff values. On the other hand, for a transition to be valid from a CV point of view, the reported and estimated CV values cannot be greater than the cutoff values.

Therefore, the definition of the following two parameters changes:

| | |
|---|---|
| $G_{i,RCVm}(m)$ | The number of Good data points that satisfy $RCV_{m,t} \leq f_{i,RCVm}(m)$. Among $C_{RRm}$ available data points, some will be smaller than the i'th cutoff parameter, $f_{i,RRm}(m)$, and some will not be. $G_{i,RCVm}(m)$ is the number of data points that meets the cutoff value (smaller than the cutoff). |
| $B_{i,RCVm}(m)$ | The number of Bad data points that do not satisfy $RCV_{m,t} \leq f_{i,RCVm}(m)$. Note that $G_{i,RCVm}(m) + B_{i,RCVm}(m) = C_{RCVm}$ for any i. |

The rules on NR (Number of Retrains) can be analogized from the code violation rules as they were for the margin rules, above. Therefore, the NR rules will not be discussed in detail, as they will be apparent to those skilled in the art.

Once the results of the underlying sub-rules are obtained, the final decision on the feasibility of target state m can be determined as a function of those sub-rule outputs. In some embodiments, the 32 rules discussed above can be used.

Among those 32 rules, some might be more important, some less important, and some might be meaningless. Therefore, certain outputs should be emphasized and/or other outputs de-emphasized in designing a feasibility tester. Before describing a preferred embodiment of one method of the present invention, two useful concepts of "moving up" and "moving down" are defined. Also, a minimum requirement on data collection that also is useful in some embodiments is described.

When considering a state transition from state n to state m, the notation "n<m" is used herein to represent a "moving up." Two different notions of "moving up" are presented herein. The first notion considers the data rate, PSD level, noise margin and carrier mask of the profile. The second notion considers the FEC protection of the profile. In the following discussion only the first notion will be called "moving up," while the second notion will be shown as a simple inequality between the coding levels of the two profiles. A state transition is defined to be "moving up" if all of the following conditions are met while at least one of them satisfies a strict inequality:

| | |
|---|---|
| Rate(n) ≤ Rate(m) | where Rate(n) is the max rate of profile n |
| PSD(n) ≥ PSD(m) | where PSD(n) is the PSD level of profile n |
| TNMR(n) ≥ TNMR(m) | where TNMR(n) is the TNMR of profile n |
| CMASK(n) ≤ CMASK(m) | meaning CMASK(n) is as restrictive as or less restrictive than CMASK(m), where CMASK(n) is the carrier mask of profile n |

In a similar manner, a state transition is defined to be "moving down" if all of the following conditions are met while at least one of them satisfies a strict inequality:

| | |
|---|---|
| Rate(n) ≥ Rate(m) | where Rate(n) is the max rate of profile n |
| PSD(n) ≤ PSD(m) | where PSD(n) is the PSD level of profile n |
| TNMR(n) ≤ TNMR(m) | where TNMR(n) is the TNMR of profile n |
| CMASK(n) ≥ CMASK(m) | meaning CMASK(m) is as restrictive as or less restrictive than CMASK(n), where CMASK(n) is the carrier mask of profile n |

A state transition might be moving neither up nor down when some parameters become more difficult to achieve while others become easier to achieve. A well-designed T matrix, however, will have only one or two parameters changed per state transition, thus simplifying and/or clarifying whether each transition is moving up, moving down or staying at the same state (n=m or only the coding level of the profile is changed).

Similarly the notation FEC(n)<FEC(m) indicates that the FEC corrective capability of profile n is lower than FEC corrective capability level of profile m. Such an FEC ranking can be achieved in one of three ways: (1) the INP (impulse noise protection power in the G.992.3/5 and G.993.2 standards) is smaller for profile n than for profile m while DELAY is the same for both; (2) the DELAY is larger for profile n than for profile m while INP is same for both; or (3) the INP is larger and DELAY is smaller for profile n than for profile m. If both INP and DELAY are smaller, then the ordering can be determined only with exact information on the frequency of impulse noise. (If the maximum number of impulses per FEC code block is defined as numIN, then FEC(n)<FEC(m) if INP(n)/numIN(n)<INP(m)/numIN(m), where INP(n) is the number of DMT symbols that can be corrected by coding. If numIN information is not available to the controller, FEC characteristics cannot be compared when both INP and DELAY are smaller or larger for profile n than for profile m.) FEC(n)=FEC(m) and FEC(n)>FEC(m) are defined in a corresponding manner, as will be appreciated by those skilled in the art.

In some cases, the data collection system might malfunction or be inactive, meaning that too little or no data might be available. In such a case, it would be helpful for the system to return NOT_ENOUGH_DATA. A line might then aggressively move up to the best state based on "innocent until guilty" rule (for example, even when margin is below 0 dB or CV is huge). To prevent such bad behavior, a profile change can be limited to those cases when only sufficient extra data has been collected since the last profile change.

Consider data collection for a line in state n. Because the line is operating in state n, any collected data will provide information on state n and thus counting the number of new available data for state n might be quite reasonable. The following rules then can be applied:

---

Perform feasibility test and state transition only if the following conditions are satisfied:
Since the last change of profile:

Each of C[$ER_{n,ds}$] and C[$ER_{n,us}$] have increased more than $K_{ERn}$;
Each of C[$RCV_{n,ds}$] and C[$RCV_{n,us}$] have increased more than $K_{RCVn}$; and
Each of C[$RNR_{n,ds}$] and C[$RNR_{n,us}$] have increased more than $K_{RNRn}$.

---

Note that the number of new data points for $ER_n$ is closely related to all of the data rate rules and margin rules. The above rule needs to be satisfied before any feasibility test and state transition are performed. If the above rule is not satisfied, a line will simply stay in the current state until new data is collected.

In some embodiments of the present invention, an overall rule may simply be a function whose inputs are the results from the sub-rules (for example, the 32 sub-rules discussed above), and whose output is either "yes" or "no" to the transition from n to m. One preferred embodiment is an overall rule that is called only if the minimum new data requirement, above, is satisfied. Such a rule, one example of which is illustrated in FIG. 5, can be composed of two parts, a "good behavior" qualification and a "bad behavior" qualification (that is, showing a sufficient absence of bad behavior), where a transition to state m is allowed only if both qualifications are satisfied.

Using the 32 sub-rules example noted above, many of the 32 outputs do not have to be used in the overall rule of FIG. 5. The 32 sub-rules represent the a general structure when data rate, margin, code violation and retraining are of concern, and changes to the overall rule might utilize any sub-combination of the sub-rules, as will be appreciated by those skilled in the art.

The first part (the good behavior qualification) says that at least some of the sub-rules must report "GOOD" for a transition to be allowed. The requirement may consist of the following three conditions:

Good behavior for rate in either current state or target state;
Good behavior for code violation in either current state or target state; and
Good behavior for number of retrains in either current state or target state.

Good behavior for margin is not included since good behavior for rate has similar implication.

The second part (the bad behavior qualification) says that bad behavior should not be expected in target state. As will be appreciated by those skilled in the art, the definition of bad behavior can differ depending on whether the state is moving down or up. When moving down, the performance in current state n serves as the lower limit of expected performance in the target state. When moving up, the performance in the current state serves as the upper limit of expected performance in the target state. Therefore the rules are slightly different whenever sub-rules related to the current state are involved. When the transition is neither moving up nor down, then a conservative decision is made by assuming it is moving up.

For maximum data rate characteristics, the method for calculating ERDC and the resulting ERDC complements RRDC as summarized above. For code violations, however, there may be no concrete way of calculating the expected CV counts, and thus $ECVDC_m = ECVDC_n = NOT\_ENOUGH\_DATA$ is assumed most of time.

For special situations, it might be possible to estimate CV. For instance, if $RFCC_{n,t}$ (Reported FEC Correction Count in state n at time interval t)=0 and $RCV_{n,t} \leq 100$ for any n and t, then it may be reasonable to guess that there is a strong impulse noise which occurs only up to 100 times per 15-minute period. If the occurrence of the impulse noise is that low and, further, if the impulse noise cannot be fixed with higher margin or a stronger FEC setting, then it might be wise to ignore the CV and simply move to the highest data rate that is feasible based on data rate, margin and retraining rules. This can be implemented by passing $ECVDC_{m,ds}$=GOOD and $ECVDC_{m,us}$=GOOD to the overall rule of FIG. 5. In this way $ECVDC_m$, when available, can be used to overrule $RCVDC_n$ and $RCVDC_m$.

The specific rules on $ECVDC_m$ can be developed as the controller (for example, a DSL optimizer) learns more about the impulse noise characteristics of the network. After collecting CV, ES, SES (Severely Errored Seconds—the count of seconds with at least two consecutive ADSL synch symbols with correlations below threshold) and FCC for various profiles, a statistical study of impulse noise can be performed. Once the appropriate patterns are identified, exact methods for calculating ECVDC might be developed.

Besides any applicable sub-rules, other rules can be added. For example, a latency rule might state that if the customer is identified as a gamer or VoIP user, then it might be necessary to prohibit high delay profiles. An SES sub-rule might be included, where this field is reported through current MIB, but is not included in the example of 32 sub-rules. Finally, other data fields in MIB can be integrated as part of the rules.

Consider a situation where a line tries state m and then moves down to a lower state because of a high number of retrains (or high number of CVs, low margin, or any other "negative" condition). Then the line's bad history (that is, the previously collected/reported/observed/calculated/estimated data) on state m would prevent future attempts to move up to state m, and thus the reported data related statistics on state m might never change. If no action is taken, the line will not be able to try state m or better again. Such a single failure, however, might be due to a very infrequent or even completely unique interference. Also, noise and interference situations might improve due to a smart/polite allocation of power and spectra in the future, or because of a change in environments. Therefore, methods of cleaning, purging or discounting old data for attempting better states are desirable. A variety of methods to accomplish this may be apparent to those skilled in the art. Several methods for purging old data follow that allow better states to be revisited automatically in the future if other indications are favorable. Note, as discussed above, that these goals also could be accomplished with a more elaborate system of states and transitions that take into account operation in earlier states and/or profiles. The use of purging/discounting of old data permits the use of a simpler state scheme (which also, as noted above, permits the equivalency of "profiles" and "states" in this embodiment).

A data weighting vector (W) can be given to each line such that the weighting for observed and/or estimated data can be applied as a function of how current the data is. For instance, if the weighting vector is W1=[1 1 1], then the data from the last three update periods (for example, days) are given equal weight to construct the data distributions. If the weighting vector is W2=[1 0 0 0 0 0 0 0.5], then the data from the last one update period is used with weighting 1 and data from 7 update periods earlier (for example, one week ago) is used with weighting 0.5. Data from other update periods are ignored. If it is desired to use data from only the last 2 months with equal weighting, then the weighting vector can be of size 60 with all ones (that is, W3=[1 1 1 . . . 1 1 1]), using an update period of one day. If W3 is used for a line and state m failed, it will likely be tried again in 60 days when the data associated with the failure is ignored (that is, effectively purged).

Different weighting vectors can be used for different rules. For instance, W3 can be used for CVDC rules, while W1 might be used for the rest of the rules. The weighting vector(s) may thus affect the cardinality and distribution calculations of the feasibility rules.

According to another method, time periods for removing bad data can be increased exponentially, as illustrated in the following example:

Clearing data after $2^{n+1}$ days. A line has attempted state m and failed because of unique data, resulting in the line's profile being reduced (most likely its data rate reduced). After 4 days, the "bad" data on m will be purged, and state m will be attempted again for this line (if no additional "bad" data has been observed or estimated so that the line is presumed "innocent" again). If the line fails again in state m, then the line profile will be reduced again, and state m will be attempted again after 8 days. If state m subsequently fails again after 8 days, then the system (for example, a controller or DSL optimizer) waits for 16 days until the bad data is purged, and then attempts again. In general, the "bad" data of state m will be cleared $2^{n+1}$ days after the last failure, where n is the total number of consecutive failures.

To enforce this rule, a controller such as a DSL optimizer only needs to keep track of the number of consecutive failures (if profiles can be only changed/updated every t days, then a failure means a failure to support a state for t days) and the date/time of the last failure for each state. In this way, the bad data can be purged at an appropriate time.

Finally, another method uses the fact that most DSL users do not use the network at all times. Therefore, the controller can model each user's network use patterns (based on ATM cell counts and/or any other parameters that reflect each user's network-use activity) to identify a time period when the user is least likely to use the network. During this time period, which is likely to be late night or early in the morning, the failed states can be tried and new performance data can be collected to replace the old data. If newly collected data shows good performance, then the target state can be tried again. Otherwise, the line will not be affected. In general, it might be best to try a rate adaptive profile with no max rate limit as often as possible. Various combinations of TNMR, PSD, FEC and/or carrier mask can be used to maximize the entropy of the new information.

As will be appreciated by those skilled in the art, the three methods described above can be combined in various ways. In particular, the last method can be easily combined with either of the first two methods.

Just like T and the threshold tables, the purging rule can be adaptively chosen depending on line/binder situation. When the statistics of observed or estimated data change significantly (for example, when CV+FEC decreases from an average of 1000 to an average of 0, previously stable margin suddenly changes by 10 dB, etc.), such a change probably is caused by a significant change in binder configuration (for example, a new DSL line connected to a DSLAM at the CO was activated, a new line connected to a DSLAM at an RT was activated, interfering lines reduced their transmit power due to a controller's dynamic control, etc.). An immediate reaction might be required. If W3, above, was being used for the purging data, then W4=[1] can be used instead to adapt quickly based on the last single day of data only. If the exponential method was being used, n can be reset to 1 so that quick changes can be made in the near future.

Just as the matrix T can be used to provide various features as a function of service profiles and the stability of lines, the threshold tables can be used to emphasize or de-emphasize individual rules. For example, if a certain vendor modem is known to report max rate numbers that are 500 kbps higher than the actual rate, then that modem's RRDC threshold table can have 500 kbps higher entries (compared to other modems) to cancel the bias. Similarly, if MAXRR (maximum rate reported) is unreliable for a line, then the entries of the RRDC threshold table can be adjusted down by 1 Mbps relative to normal RRDC table entries. In this way, RMDC, ERDC and EMDC will be the limiting rules on maximum rate, rather than RRDC being the limiting rule most of time. In general, the threshold tables can be updated whenever some segment of the data fields is detected to be unreliable or whenever a threshold table is detected to be either too restrictive or not restrictive enough.

In another situation, individual modems used in communication systems such as DSL systems can possess individual characteristics that might affect collected operational data that changes and/or impacts the accuracy, reliability, etc. of reported data and estimated data. In some cases, therefore, it may be desirable to acquire as much information as is possible and/or practical about the modem(s) used in a given system. As will be appreciated by those skilled in the art, there are various ways to gather this type of information. Techniques and apparatus for identifying modems and their operation characteristics are disclosed in U.S. Ser. No. 10/981,068, filed Nov. 4, 2004, entitled COMMUNICATION DEVICE IDENTIFICATION and owned by Adaptive Spectrum And Signal Alignment, Inc., the entire disclosure of which is incorporated herein by reference.

In the xDSL systems, some of the data have range limits for reporting. For instance, the maximum margin that can be reported may be 31 dB, and the minimum power that can be reported may be only 0 dBm in an ADSL1 system. If ambiguous information relative to such parameters is reported, then any estimation of maximum rate, margin, etc. based on such ambiguous information might itself also be ambiguous. In such cases, one simple solution is to ignore such data points by marking them as invalid. However, a better solution may be to examine whether it is possible to make reliable use of that data.

Considering the ERDCm rule, for example, the reported margin may be 31 dB even though the true margin is above 31 dB. If a controller such as a DSL optimizer uses 31 dB for margin, then the estimated maximum rate will be smaller than the true maximum rate. Thus the result is an overly conservative estimation of the max rate. If this conservative estimation is still large enough to be counted toward $G_{i,ERm}(m)$ for the i'th rule, then the data should nevertheless be considered and used as valid data. If the conservative estimation is too small to qualify for $G_{i,ERm}(m)$, then the data should be considered invalid for the i'th rule and therefore be ignored. $C_{ERm}$ needs to be adjusted to ignore the invalid data. A similar solution can be applied when reported transmit power is 0 dBm, since a controller would find an overly conservative maximum rate in such a case as well. The same modification of rules applies to $ERDC_n$, $EMDC_n$, $EMDC_m$, $RMDC_n$ and $RMDC_m$.

The sub-rules also can be modified to accommodate more sophisticated models such as HMM (Hidden Markov Model). In such a case, the overall rule can stay independent as long as the outputs of the sub-rules are kept same. The overall rule and sub-rules are designed such that each can be modified or upgraded without requiring changes to the others.

Figure 6:
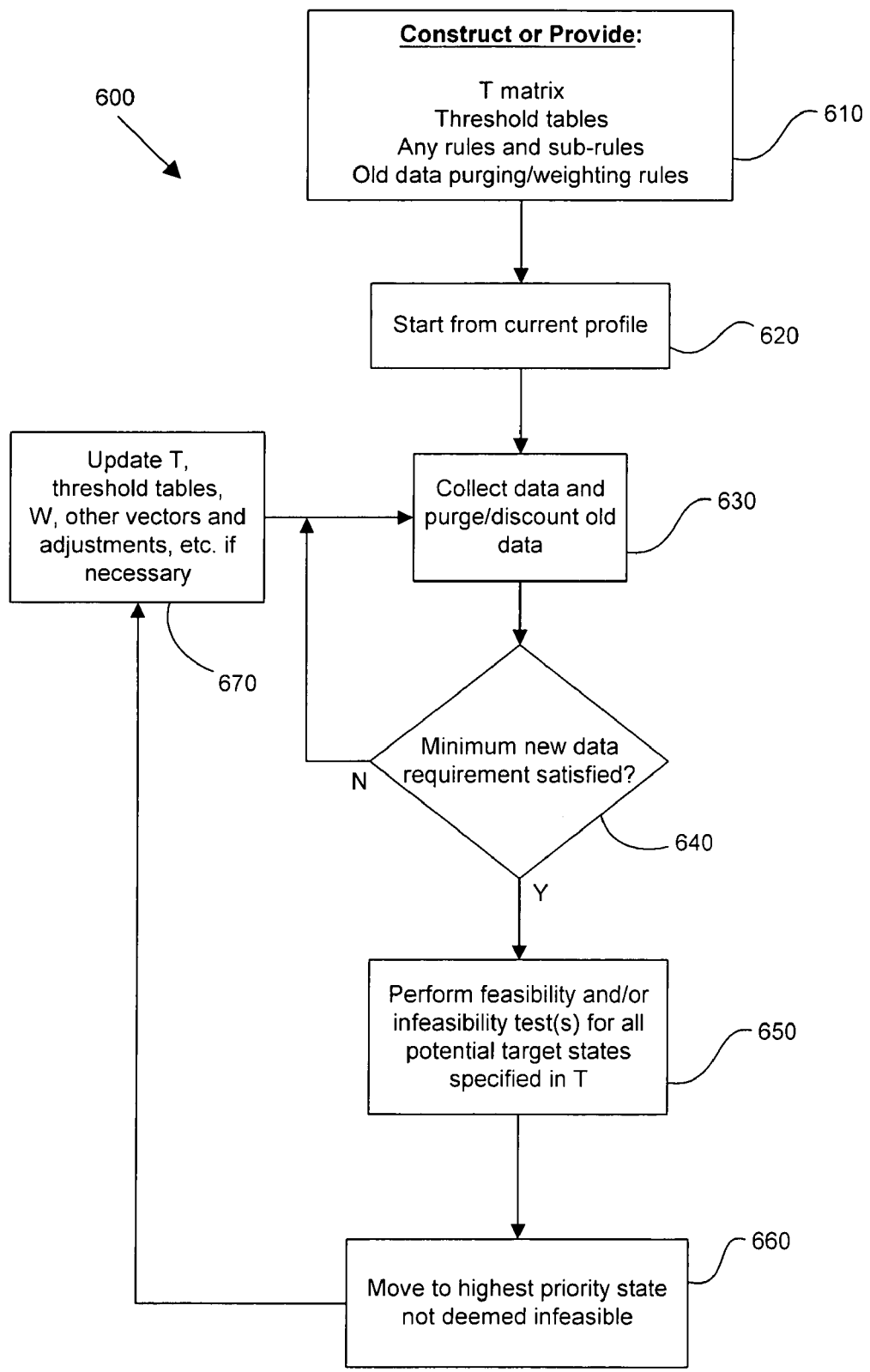
FIG. 6 is a flow diagram showing one or more embodiments of the present invention in which transitioning operation of a DSL line or other communication line from a current state to one or more target states is evaluated.

One embodiment of the present invention is shown in the flow diagram of FIG. 6. Method 600 commences with the construction 610 (and/or implementation or programming) of the T matrix (or any other state-transition control mechanism), threshold tables (or the like), any rules and/or sub-rules governing transitions, and any rules for purging, discounting or otherwise weighting old data. A "current profile" or state n is selected and operation begins using this profile at 620. Operational data is collected at 630 and any old data available is purged and/or discounted as appropriate (for example, by using a data weighting vector W). Method 600 then verifies that there is sufficient new data (for example, both reported data and estimated data) at 640 to permit evaluation of the infeasibility of any target state (using the rule that any state is presumed feasible until proven otherwise). If sufficient new data is not available, then the method returns to data collection at 630.

If sufficient new data has been assembled, then feasibility tests can be run at 650 for all potential target states m to determine whether any can be disqualified. Once the eligible target states have been identified, the system may move at 660 to the highest priority state available. The system then can update transition rules and data at 670, such as a T matrix, threshold tables, data weighting rules/vectors, etc. and return to data collection at 630 for the next transition evaluation.

Figure 7:
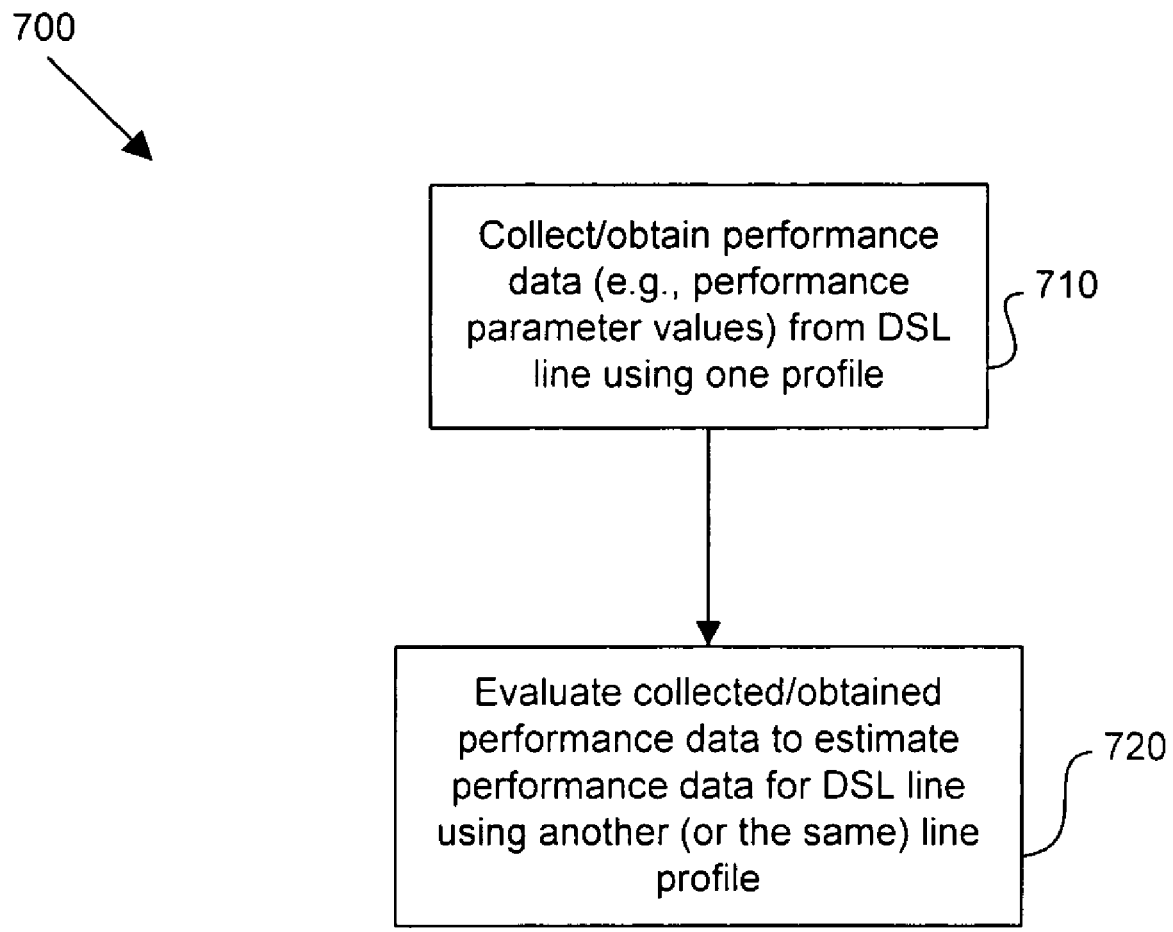
FIG. 7 is a flow diagram of another embodiment of the present invention for estimating performance data for a DSL line using a target line profile.

FIG. 7 illustrates another embodiment of the present invention. The method of FIG. 7 may be implemented in various apparatus, including the systems shown in FIGS. 3A and 3B. The method 700 begins with collecting or otherwise obtaining at 710 performance data, such as performance parameter values, from a DSL line using a given line profile. This performance data may include data and/or values relating to code violations, FEC correction counts, noise margins, retraining counts, etc. The line profile from which the performance data is collected/obtained at 710 may be the line profile currently being used by the DSL line. At 720 the obtained performance data is evaluated to generate an estimation of the DSL line's performance in a target line profile. The target line profile may be different from the current line profile or may be the current line profile itself if the system is attempting to evaluate whether it is infeasible to stay in the current state and/or profile. Where the given line profile and target line profile differ, they may differ by one or more operational parameters, as noted above. Moreover, the method of FIG. 7 also may use reported data and/or estimated data, as appropriate, as will be appreciated by those skilled in the art.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
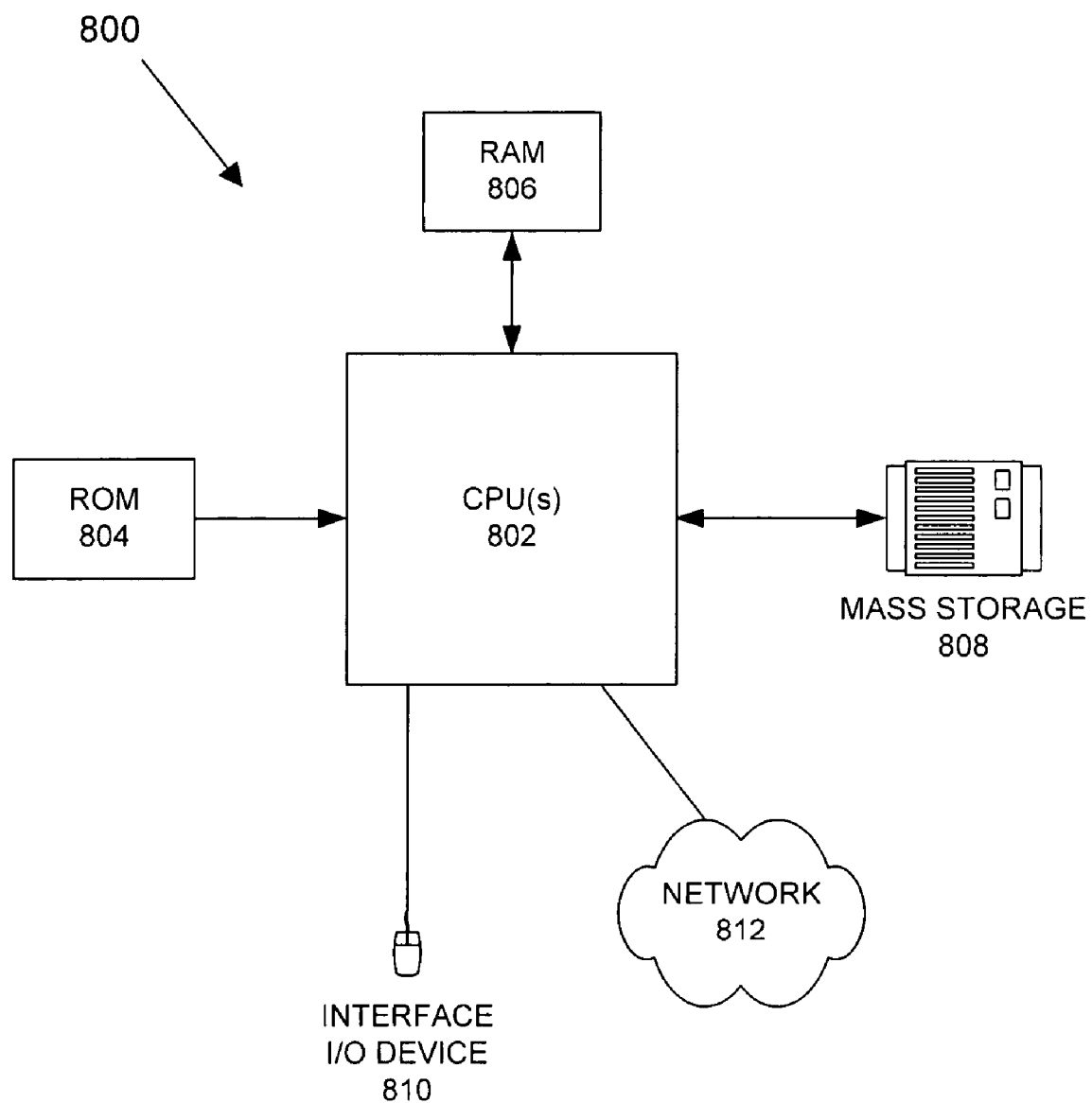
FIG. 8 is a block diagram of a typical computer system or integrated circuit system suitable for implementing embodiments of the present invention.

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM may also pass data uni-directionally to the CPU.

CPU 802 also is coupled to an interface 810 that includes one or more input/output devices such as such as video monitors, track balls, mice, keyboards microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 808 and executed on CPU 802 in conjunction with primary memory 806. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of evaluating whether to transition operation of a DSL line from a current line profile to one or more target line profiles, the method comprising:
 (1) providing:
  (a) a profile transition matrix,
  (b) a plurality of threshold tables,
  (c) a plurality of sub-rules, and
  (d) an overall rule,
 (2) operating in the current profile;
 (3) collecting operational data;
 (4) performing one or more feasibility tests to evaluate the feasibility of the current line profile and each of the target line profiles; and
 (5) operating the DSL line in the highest feasible profile available.

2. The method of claim 1 wherein the threshold tables relate to the probabilities of occurrences of performance criteria.

3. The method of claim 1 wherein the current profile and target profile differ by at least one of the following operational parameters:
 data rate;
 FEC coding;
 PSD;
 TSNRM;
 MAXSNRM;
 MINSNRM;
 CARMASK;
 INP; or
 DELAY.

4. The method of claim 1 wherein the collected operational data is used to provide reported data and estimated data.

5. The method of claim 4 wherein the reported data includes at least one of the following:
 reported maximum attainable data rate;
 reported FEC correction count;
 reported noise margin;
 reported code violation count;
 reported errored seconds;
 reported severely errored seconds; or
 reported number of retrainings count.

6. The method of claim 4 wherein the estimated data includes at least one of the following:
 estimated maximum attainable data rate;
 estimated FEC correction count;
 estimated noise margin;
 estimated code violation count; or
 estimated number of retrainings count.

7. The method of claim 1 wherein the state transition matrix prioritizes available states.

8. The method of claim 1 wherein the overall rule combines outputs from the plurality of sub-rules to arrive at a determination of the feasibility of potential target states.

9. The method of claim 1 wherein each of the sub-rules comprises an examination of at least one of the following:
 a distribution of data relating to the current line profile; or
 a distribution of data relating to each target line profile.

10. The method of claim 1 wherein performing one or more feasibility tests to evaluate the feasibility of the current line profile and each of the target line profiles comprises weighting old data.

11. The method of claim 1 further comprising adaptively updating at least one of the following:
 the profile transition matrix;
 at least one threshold table from the plurality of threshold tables; or
 a weighting applied to old data.

12. The method of claim 1 wherein performing one or more feasibility tests to evaluate the feasibility of the current line profile and each of the target line profiles comprises requiring a minimum amount of data as a prerequisite to evaluating the feasibility of any line profile.

13. A method of evaluating whether to transition operation of a DSL line from a current line profile to one or more target line profiles, the method comprising:
 providing a state transition matrix comprising prioritization of the target line profiles, a plurality of threshold tables comprising sub-rules, and an overall rule;
 operating in the current line profile;
 collecting operational data to generate reported data and estimated data pertaining to operation of the DSL line in at least one of: the current line profile, or one of the target line profiles;
 performing one or more feasibility tests to evaluate the infeasibility of moving from the current line profile to each of the target line profiles; and
 operating the DSL line in a best line profile, wherein the best line profile comprises whichever of the current line profile and the target line profiles that has the highest priority in the state transition matrix and is not evaluated to be infeasible.

14. The method of claim 13 wherein the current line profile and the target line profile differ by at least one of the following operational parameters:
 data rate;
 FEC coding;
 PSD;
 TSNRM;
 MAXSNRM;
 MINSNRM;
 CARMASK;
 INP; or
 DELAY.

15. The method of claim 13 wherein the reported data and the estimated data each comprise data relating to at least one of the following:
 maximum attainable data rate;
 FEC correction count;
 noise margin;
 code violation count;
 errored seconds;
 severely errored seconds; or
 number of retrainings count.

16. The method of claim 13 wherein the overall rule combines outputs from the sub-rules to arrive at a determination of the infeasibility of potential target states.

17. A DSL optimizer for evaluating whether to instruct a DSL line operating in a current line profile to operate in one of a plurality of potential line profiles, comprising:
 a controller comprising a data collection module and an analysis module, wherein the controller is coupled to a DSL system comprising the DSL line and DSL equipment operating on the DSL line using the current line profile;
 wherein the collection module is configured to collect operational data pertaining to operation of the DSL line in one or more of the potential line profiles, wherein the potential line profiles comprise one or more of: the current line profile or one or more target line profiles;
 further wherein the analysis module comprises: implementation of a state transition matrix comprising prioritization of the potential line profiles and implementation of one or more rules; and further wherein the analysis module is to: perform one or more feasibility tests to determine the feasibility of moving from the current line profile to each of the potential line profiles and to instruct the DSL line to operate using a best available line profile, wherein the best available line profile comprises the potential line profile that has the highest priority in the state transition matrix and has not been determined to be infeasible.

18. The DSL optimizer of claim 17 wherein the one or more rules comprise:
   a plurality of sub-rules; and
   an overall rule that determines feasibility of a potential line profile using outputs from the plurality of sub-rules.

19. The DSL optimizer of claim 17 wherein the collected operational data is used to generate reported data and estimated data.

20. The DSL optimizer of claim 19 wherein the reported data and the estimated data each comprise data relating to at least one of the following:
   maximum attainable data rate;
   FEC correction count;
   noise margin;
   code violation count; or
   number of retrainings count.

21. The DSL optimizer of claim 17 wherein the current line profile and each target line profile differ by at least one of the following operational parameters:
   data rate;
   FEC coding;
   PSD;
   TSNRM;
   MAXSNRM;
   MINSNRM; CARMASK; I
   NP; or
   DELAY.

* * * * *